(12) United States Patent
Lewis et al.

(10) Patent No.: US 12,236,162 B2
(45) Date of Patent: Feb. 25, 2025

(54) AUDIO PARAMETER ADJUSTMENT BASED ON PLAYBACK DEVICE SEPARATION DISTANCE

(71) Applicant: Sonos, Inc., Santa Barbara, CA (US)

(72) Inventors: Jerad Lewis, Cambridge, MA (US); Douglas John Button, Simi Valley, CA (US); Kylie Beth Muntean, Santa Barbara, CA (US); Daniel Jones, London (GB); Adib Mehrabi, London (GB); Christopher William Pike, Manchester (GB)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/497,221

(22) Filed: Oct. 30, 2023

(65) Prior Publication Data
US 2024/0061642 A1 Feb. 22, 2024

Related U.S. Application Data

(63) Continuation of application No. 18/166,718, filed on Feb. 9, 2023, now Pat. No. 11,809,782, which is a continuation of application No. PCT/US2022/077233, filed on Sep. 29, 2022.

(60) Provisional application No. 63/261,929, filed on Sep. 30, 2021.

(51) Int. Cl.
G06F 3/16 (2006.01)
(52) U.S. Cl.
CPC .................. G06F 3/165 (2013.01)

(58) Field of Classification Search
CPC ...................................................... G06F 3/165
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |

(Continued)

FOREIGN PATENT DOCUMENTS

| | | |
|---|---|---|
| EP | 1389853 A1 | 2/2004 |
| JP | 1988-243499 A2 | 9/1998 |

(Continued)

OTHER PUBLICATIONS

AudioTron Quick Start Guide, Version 1.0, Mar. 2001, 24 pages.

(Continued)

Primary Examiner — Joseph Saunders, Jr.
(74) Attorney, Agent, or Firm — Finch & Maloney PLLC

(57) ABSTRACT

Embodiments disclosed herein include playback devices configured to operate in one or more playback configurations including configurations individual playback devices play back one or more corresponding channels of multi-channel audio content. An audio parameter can be determined based on a distance between playback devices. In some examples, the audio parameter comprises a filter such as a low frequency filter that varies based on at least the distance between the playback devices. After the audio parameter is determined, the playback devices can play back audio content according to the determined audio parameter.

20 Claims, 19 Drawing Sheets

(56) References Cited

U.S. PATENT DOCUMENTS

| | | | |
|---|---|---|---|
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,078,135 | B1 | 9/2018 | Almada et al. |
| 10,952,005 | B1 | 3/2021 | McGrael et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2010/0135118 | A1* | 6/2010 | Van Leest ............... H04S 7/301 367/124 |
| 2013/0024018 | A1 | 1/2013 | Chang et al. |
| 2013/0243199 | A1 | 9/2013 | Kallai et al. |
| 2014/0064492 | A1 | 3/2014 | Lakkundi et al. |
| 2014/0119561 | A1 | 5/2014 | Banks et al. |
| 2014/0169569 | A1 | 6/2014 | Toivanen et al. |
| 2020/0133621 | A1 | 4/2020 | Milne et al. |
| 2022/0408210 | A1 | 12/2022 | Shih et al. |

FOREIGN PATENT DOCUMENTS

| | | |
|---|---|---|
| WO | WO2000076266 A2 | 12/2000 |
| WO | 200153994 | 7/2001 |
| WO | 2003093950 A2 | 11/2003 |
| WO | WO2008087548 A2 | 7/2008 |
| WO | 2020247811 A1 | 12/2020 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Dec. 30, 2022, issued in connection with International Application No. PCT/US2022/077233, filed on Sep. 29, 2022, 16 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on May 11, 2023, issued in connection with U.S. Appl. No. 18/166,718, filed Feb. 9, 2023, 18 pages.
Notice of Allowance mailed on Sep. 5, 2023, issued in connection with U.S. Appl. No. 18/166,718, filed Feb. 9, 2023, 7 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Europe Patent Application EP 22 87 7555, Extended European Search Report dated Jan. 2, 2025 (8 pages).

\* cited by examiner

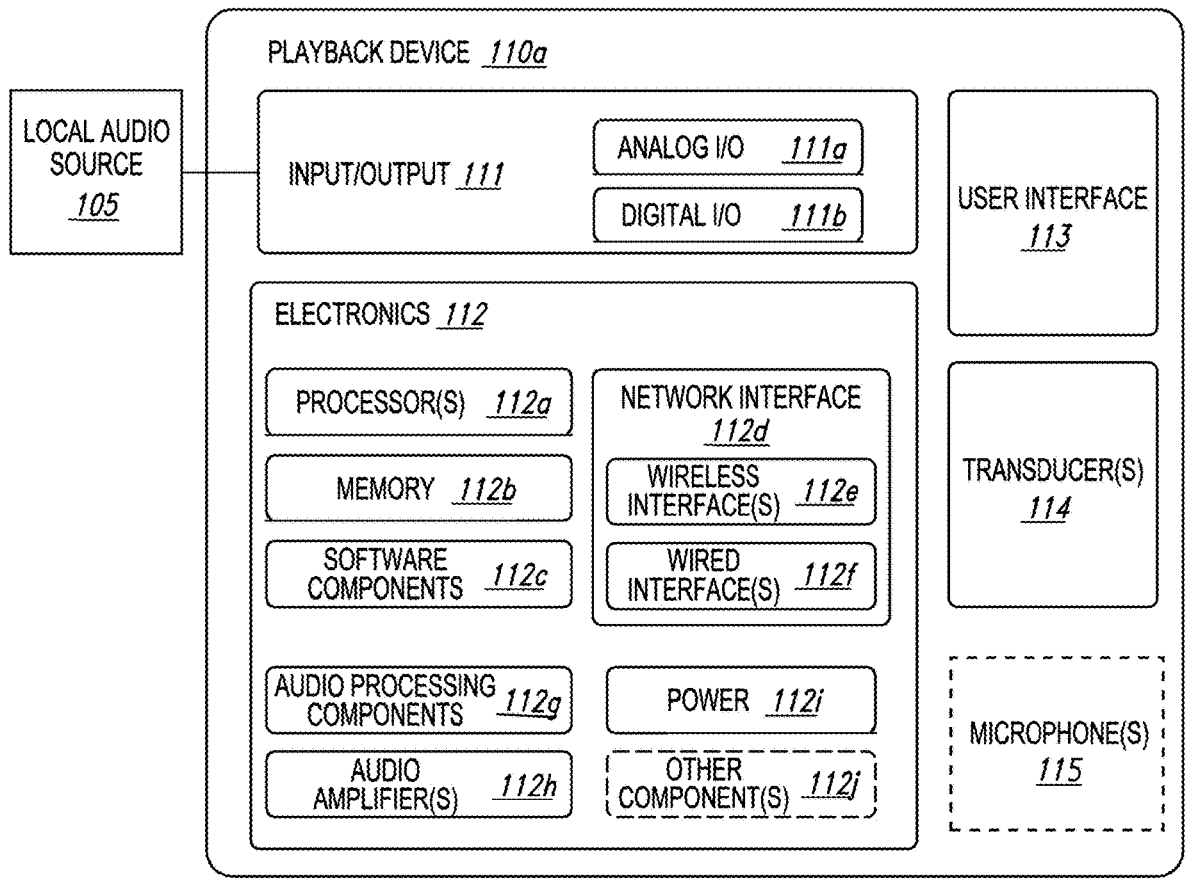
*Fig. 1C*
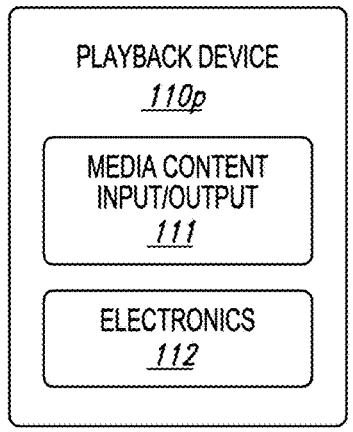
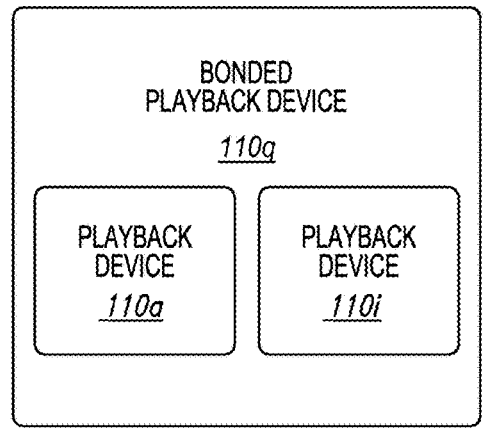
*Fig. 1D*  *Fig. 1E*

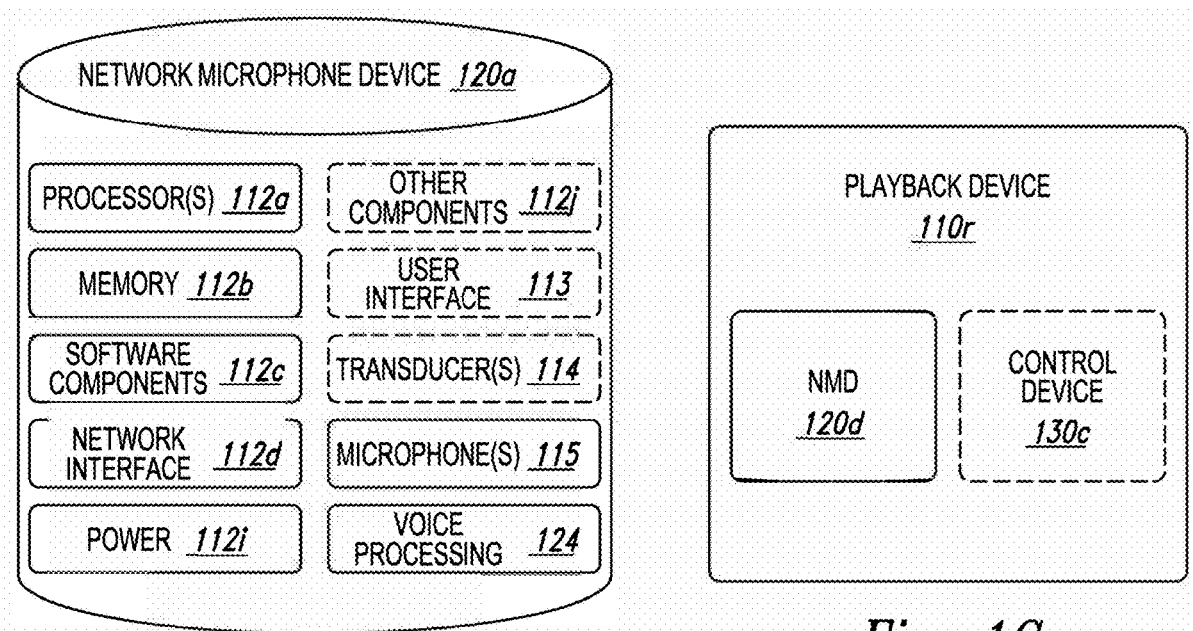
Fig. 1F
Fig. 1G
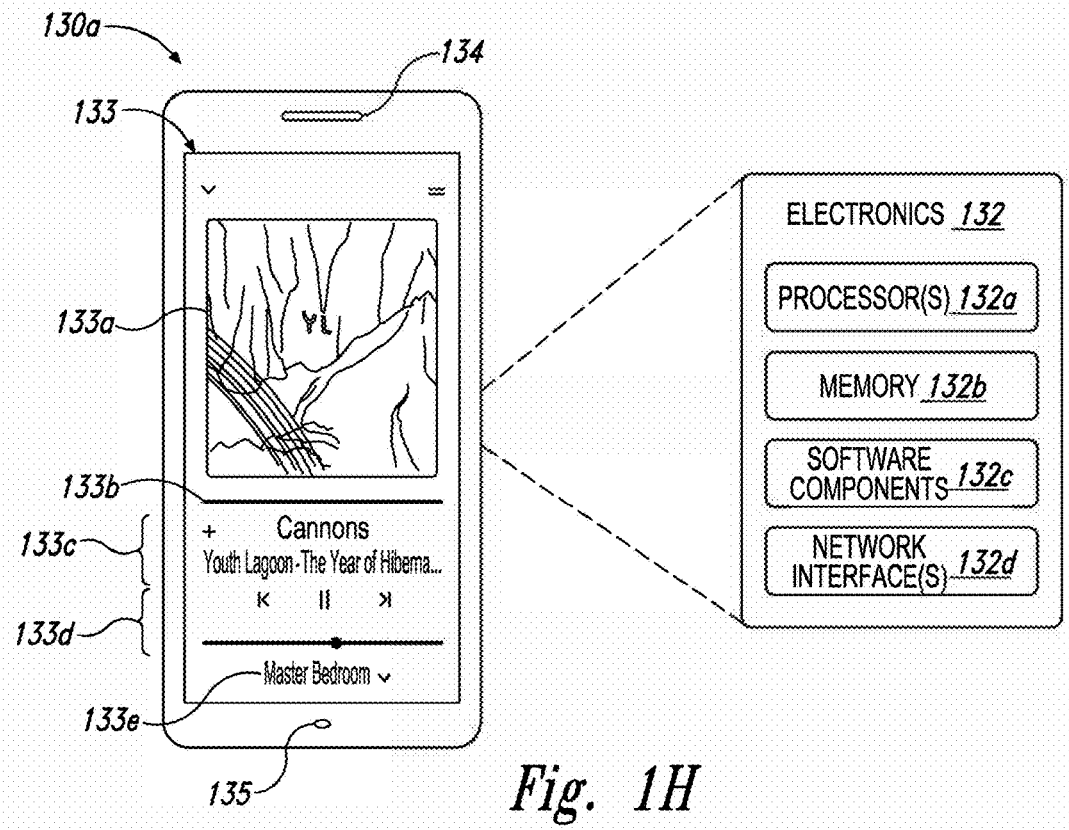
Fig. 1H

AUDIO PARAMETER ADJUSTMENT BASED ON PLAYBACK DEVICE SEPARATION DISTANCE

CROSS-REFERENCE TO RELATED APPLICATIONS

This is a continuation of U.S. patent application Ser. No. 18/166,718 (filed 9 Feb. 2023), which is a continuation of International Application PCT/US22/77233 (filed 29 Sep. 2022), which claims the benefit of U.S. Provisional Patent Application 63/261,929 (filed 30 Sep. 2021). The content of each of the applications cited above is hereby incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The SONOS Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a playback device.

FIG. 1F is a block diagram of a network microphone device.

FIG. 1G is a block diagram of a playback device.

FIG. 1H is a partial schematic diagram of a control device.

Figure 1A:
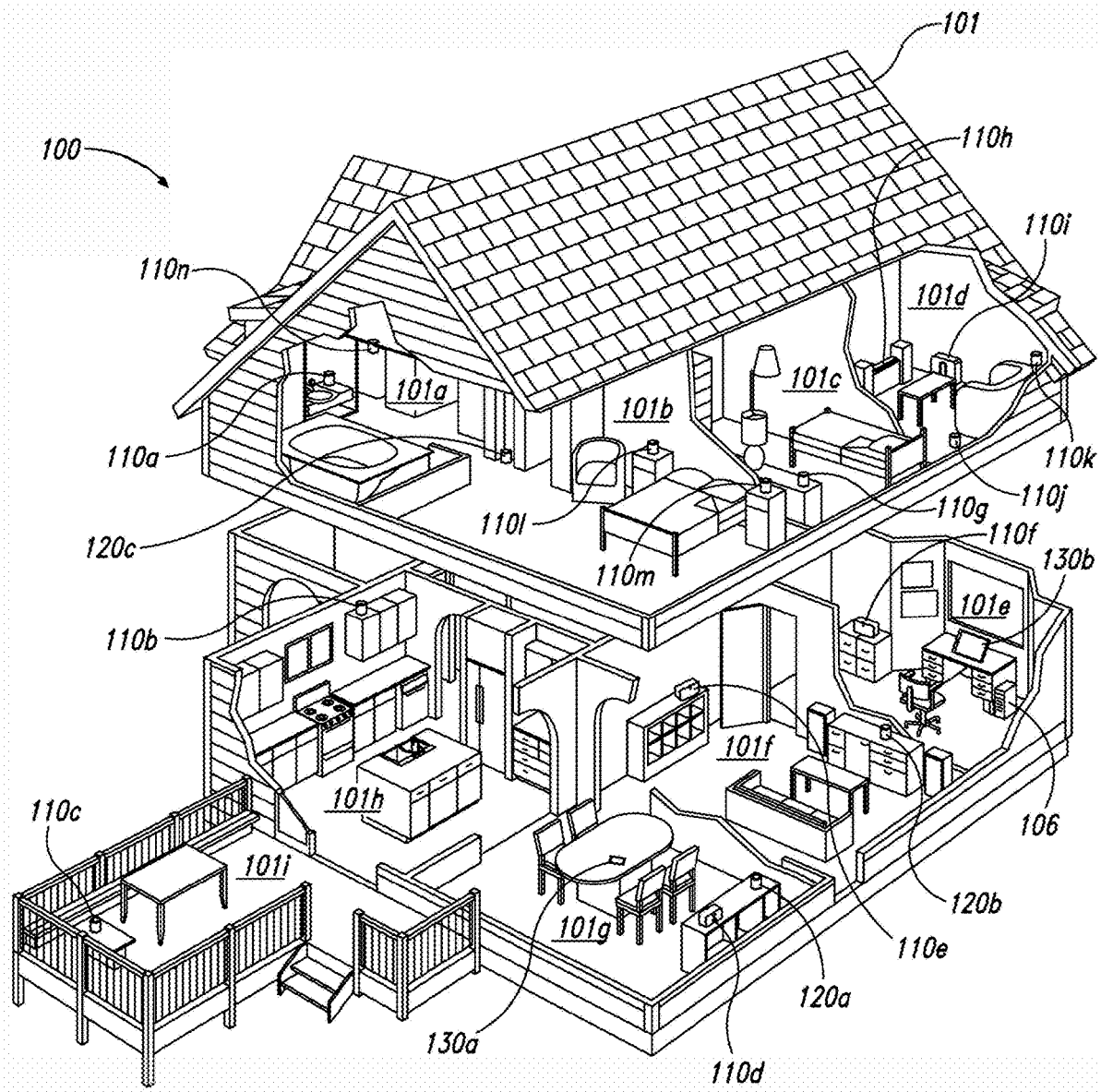
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Devices in conventional media playback systems can be bonded or paired such that individual devices are assigned playback responsibility of individual channels. For instance, in a stereo pair mode, a first playback device can be configured to play back left channel audio content and a second playback device can be configured to play back right channel audio content. When two devices are in a stereo pair, a fixed low frequency shelf filter can be applied to both devices to reduce bass output compared to how each device would be tuned for mono playback. The low frequency shelf filter is applied because, at these low frequencies (e.g., less than 1 kilohertz (kHz.)), bass audio from each device can add together coherently. Without this filter, the low frequency energy would increase in a way that would result in more bass than is desired for a given tuning.

In conventional media playback systems, the low frequency shelf filter may be applied to all devices in a stereo pair configuration, regardless of placement or distance therebetween. The level of low frequency energy that sums coherently, however, is strongly dependent on the spacing between the stereo devices. In some instances, the low frequency shelf filter may reduce bass output too much, while in other instances, the low frequency shelf filter may be insufficient to reduce excessive bass due to coherent addition of the low frequency output.

To this end, embodiments disclosed herein describe playback devices that leverage suitable methods, such as ultra-wideband (UWB) technology (e.g., UWB radios, multiple antennas, and switching capabilities), to determine the relative distance(s) between playback devices and adjust one or more audio parameters accordingly. In some examples, for instance, based on the distance between two playback devices in a stereo pair configuration, a low frequency shelf filter is adjusted such that the bass output from the combined stereo pair more closely aligns to the mono bass output from a single device. In some examples, for instance, the low frequency shelf filter may be configured to normalize the bass output from the combined stereo pair to be within approximately plus or minus 3 dB of the mono bass output from a single device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
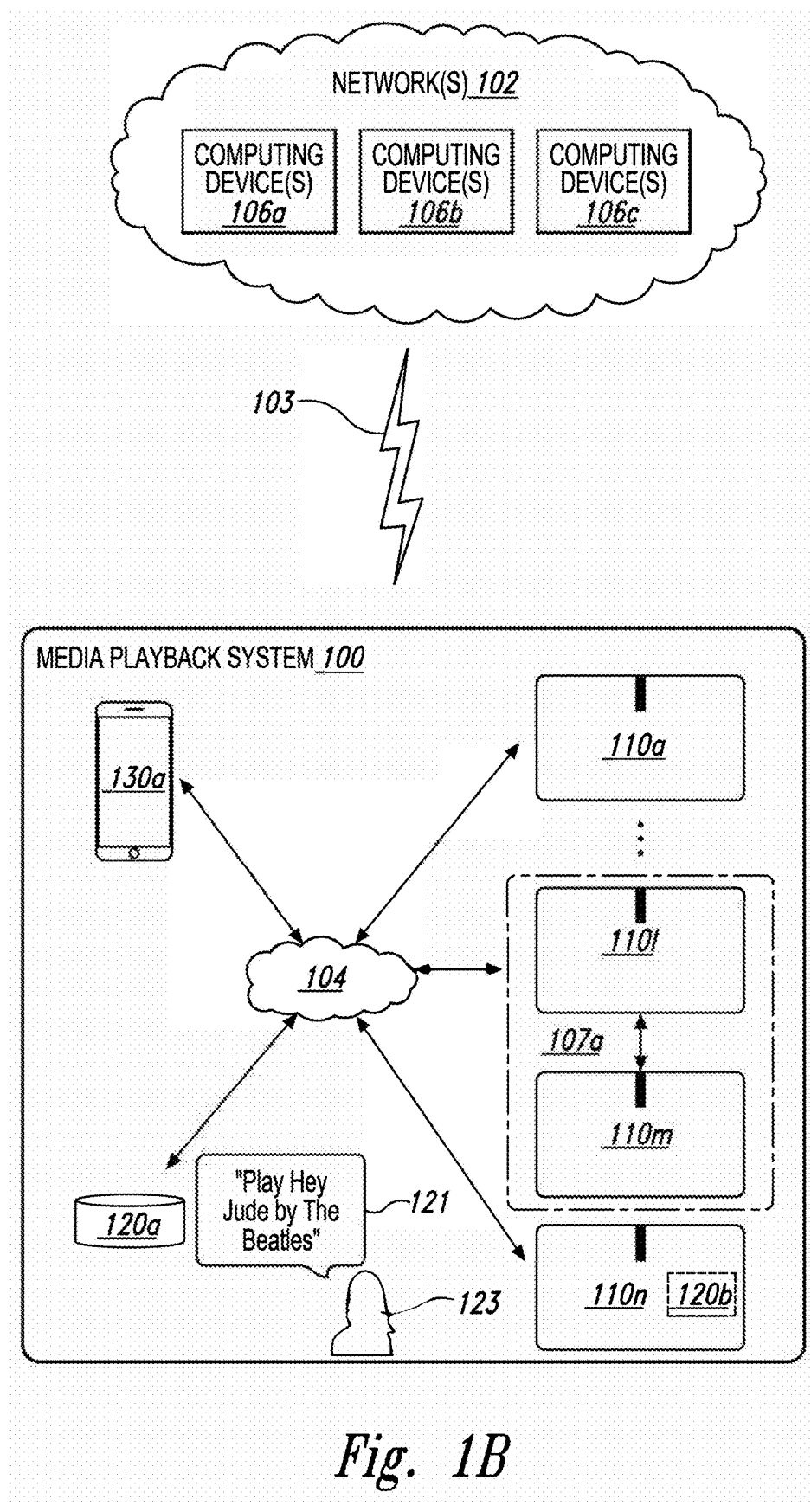
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTH network, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WI-FI network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS, AMAZON, GOOGLE APPLE, MICROSOFT). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WI-FI, BLUETOOTH, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, Sonos, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to Sonos product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is a full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 112h, and/or other playback device components. In certain embodiments, the NMD 120a comprises an Internet of Things (IoT) device such as, for example, a thermostat, an alarm panel, a fire and/or smoke detector, etc. In some embodiments, the NMD 120a comprises the microphones 115, the voice processing 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers, etc.).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1C) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa." Other examples include "Ok, Google" for invoking the GOOGLE VAS and "Hey, Siri" for invoking the APPLE VAS.

After detecting the activation word, voice processing 124 monitors the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one or more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 132b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Communication Systems

Figure 1I:
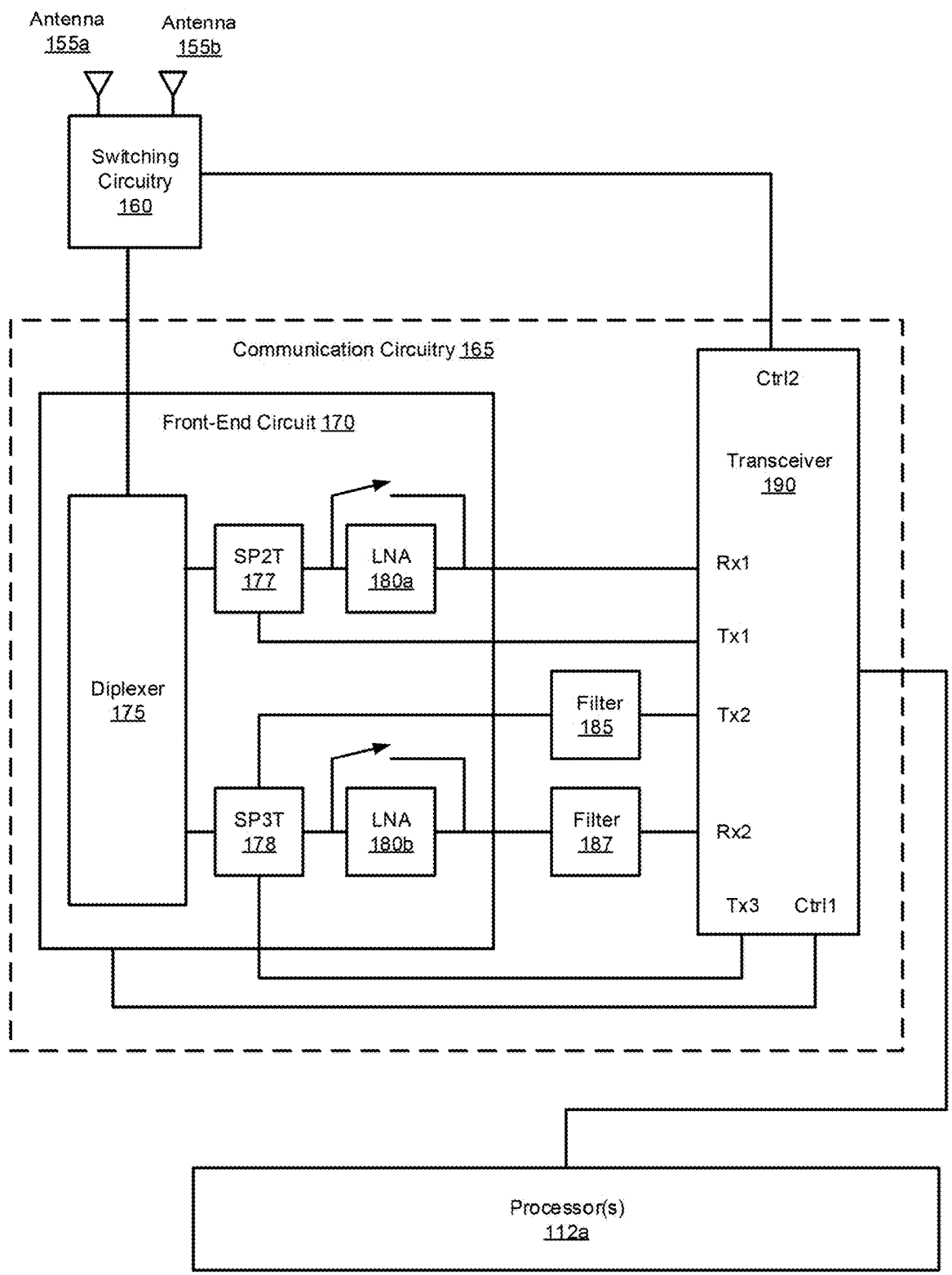
FIG. 1I illustrates an example communication system that includes example switching circuitry and/or communication circuitry configurations.

FIG. 1I, shows an example communication system 150 that includes example switching circuitry 160 and/or communication circuitry 165 configurations. The communication system 150 may be implemented in, for example, any of a variety of network devices including playback devices 110. For example, the communication system may be used to communicate with other playback devices or components of a home theater system. Such communication may include instructions, control signals, or messages of any type.

Referring to FIG. 1I, in some embodiments, the communication circuitry 165 is coupled to a common port of the switching circuitry 160 and comprises a front-end circuit 170, a filter 187, a transceiver 190, and a filter 185. Optionally, in some embodiments, the filter 187 and/or the filter 185 may be included in the front-end circuit 170. Further, in some embodiments, the transceiver 190 may be coupled to the one or more processors 112*a*. The transceiver 190 may be configured for operation in multiple modes (e.g., a UWB mode, a 2.4 GHz WI-FI operation mode, a 5.0 GHz WI-FI operation mode, a 6.0 GHz WI-FI operation mode, and/or a BLUETOOTH operation mode).

In some embodiments, the switching circuitry 160 may be configured to selectively couple one of antennas 155*a* and 155*b* to the communication circuitry 165 based on a received control signal. The switching circuitry 160 may be implemented using, for example, one or more switches such as a single-pole, double throw switch (SP2T) switch. In some examples, the control signal may be generated by, for example, the transceiver 190 (e.g., provided via a second control port (CTRL2)). In these examples, the transceiver 190 may comprise one or more network processors that execute instructions stored in a memory (e.g., a memory within the transceiver 190 such as an internal read-only memory (ROM) or an internal read-write memory) that causes the transceiver 190 to perform various operations. An antenna switching program (e.g., that controls the switching circuitry 160 in accordance with the methods described herein) may be stored in the memory and executed by the one or more network processors to cause the transceiver 190 to generate and provide control signals to the switching circuitry 160. In other examples, the control signal for the switching circuitry 160 may be generated by the processor 112*a* instead of the transceiver 190.

In some embodiments, the front-end circuit 170 may further include a diplexer 175 comprising (i) a first port coupled to a SP2T switch 177, (ii) a second port coupled to a single pole, triple throw (SP3T) switch 178, and (iii) a third port coupled to the switching circuitry 160. The diplexer 175 is configured to separate multiple channels, for example, using one or more filters. More specifically, the diplexer 175 receives a wide-band input from one or more of the antennas 155*a* and 155*b* (e.g., via the switching circuitry 160) and provides multiple narrowband outputs. For example, the diplexer 175 may provide a first narrow-band output for a 5 GHz frequency band at the first port to SP2T switch 177 and provide a second narrow-band output for a 2.4 GHz frequency band at the second port to SP3T switch 178.

In some embodiments, SP2T switch 177 comprises a first port coupled to a low noise amplifier (LNA) 180*a*, a second port coupled to a first transmit port (TX1) of the transceiver 190 (e.g., a 5.0 GHz WI-FI transmit port), and a common port coupled to the diplexer 175. The SP2T switch 177 is configured to selectively couple the common port of the SP2T switch 177 to either the first port or the second port of the SP2T switch 177 based on a received control signal. The control signal may be provided by, for example, the transceiver 190 (e.g., via a first control port (CTRL1) of the transceiver 190).

In some embodiments, SP3T switch 178 comprises a first port coupled to LNA 180*b*, a second port coupled via BPF 185 to a second transmit port (TX2) of the transceiver 190 (e.g., a 2.4 GHz WI-FI transmit port), a third port coupled to a third transmit port (TX3) of the transceiver 190 (e.g., a BLUETOOTH transmit port), and a common port coupled to the diplexer 175. The SP3T switch 178 is configured to selectively couple the common port of the SP3T switch 178 to either the first port, the second port, or the third port of the SP3T switch 178 based on a received control signal. The control signal may be provided by, for example, the transceiver 190 (e.g., via the first control port (CTRL1) of the transceiver 190).

In some embodiments, each of the LNAs 180*a* and 180*b* are further coupled to a first receive port (RX1) (e.g., a 5.0 GHz WI-FI receive port) and a second receive port (RX2) (e.g., a 2.4 GHz WI-FI and/or BLUETOOTH receive port) via filter 187, respectively, of the transceiver 190. In operation, the LNAs 180*a* and 180*b* amplify the wireless signals detected by the antennas prior to being received by the transceiver 190 (which may contain additional amplifiers such as additional LNAs) to improve receive sensitivity of the communication system 150. A bypass switch may be coupled in parallel with each of the LNAs 180*a* and 180*b* that may be controlled by the transceiver 190 (e.g., via the first control port CTRL1 of the transceiver 190). In operation, the bypass-switch allows the transceiver 190 (or other control circuitry) to close the bypass-switch when the signal received at the transceiver 190 is above a threshold to avoid saturation of one or more amplifiers in the transceiver 190. Thus, the bypass-switch may be open when the signal received at the transceiver 190 has an amplitude below a threshold to improve receive sensitivity and closed when the signal received at the transceiver 190 has an amplitude above the threshold to avoid amplifier saturation.

The filter 187 is desirable in some embodiments to filter out external noise from the environment. In a standard operating environment, there may be a lot of noise near and in the 2.4 GHz band including, for example, noise from cordless home phones, cell phones, etc. In operation, the filter 187 is configured to remove such wireless signal interference in the operating environment. The filter 187 may be designed as a bandpass (BPF) filter, a low-pass filter, and/or a high-pass filter.

The filter 185 may be desirable in some embodiments to reduce out-of-band energy in the output from the transceiver 190 (e.g., from the second transmit port TX2). For example, the output of the transceiver 190 may comprise some energy that is out-of-band when outputting a wireless signal in a channel that is on the edge of the band (e.g., channel 1 or channel 11 in a 2.4 GHz WI-FI band). The filter 185 may be designed as a BPF filter, a low-pass filter, and/or a high-pass filter. The filter 185 may, in some implementations, be implemented as a controllable filter (e.g., a controllable BPF). For example, the filter 185 may comprise a BPF and one or more switches that either allow the BPF to be incorporated into the signal path between the transceiver 190 and the SP3T switch 178 or bypassed. In this example, the transceiver 190 may provide a control signal (not shown) to the controllable filter to either have the BPF be included in the signal path or bypassed.

The filters 185 and 187 may be constructed in any of a variety of ways. For instance, the filters 185 and 187 may be constructed using one or more of: a surface acoustic wave (SAW) filter, a crystal filter (e.g., quartz crystal filters), and/or a bulk acoustic wave (BAW) filter. Further, the filter 185 need not be constructed in the same way as the filter 187. For instance, the filter 187 may be implemented as a SAW and the filter 185 may be implemented as another type of filter.

It should be appreciated that the communication system 150 shown in FIG. 1I may be modified in any of a variety of ways without departing from the scope of the present disclosure. For example, the number of one or more components (e.g., antennas, filters, front-end circuits, etc.) may be modified based on the particular implementation. For instance, as shown in FIG. 1I, the number of antennas may be reduced to 1 (shown as antenna 155a) and, as a result of reducing the number of antennas, the switching circuitry 160 may be removed altogether.

Figure 1J:
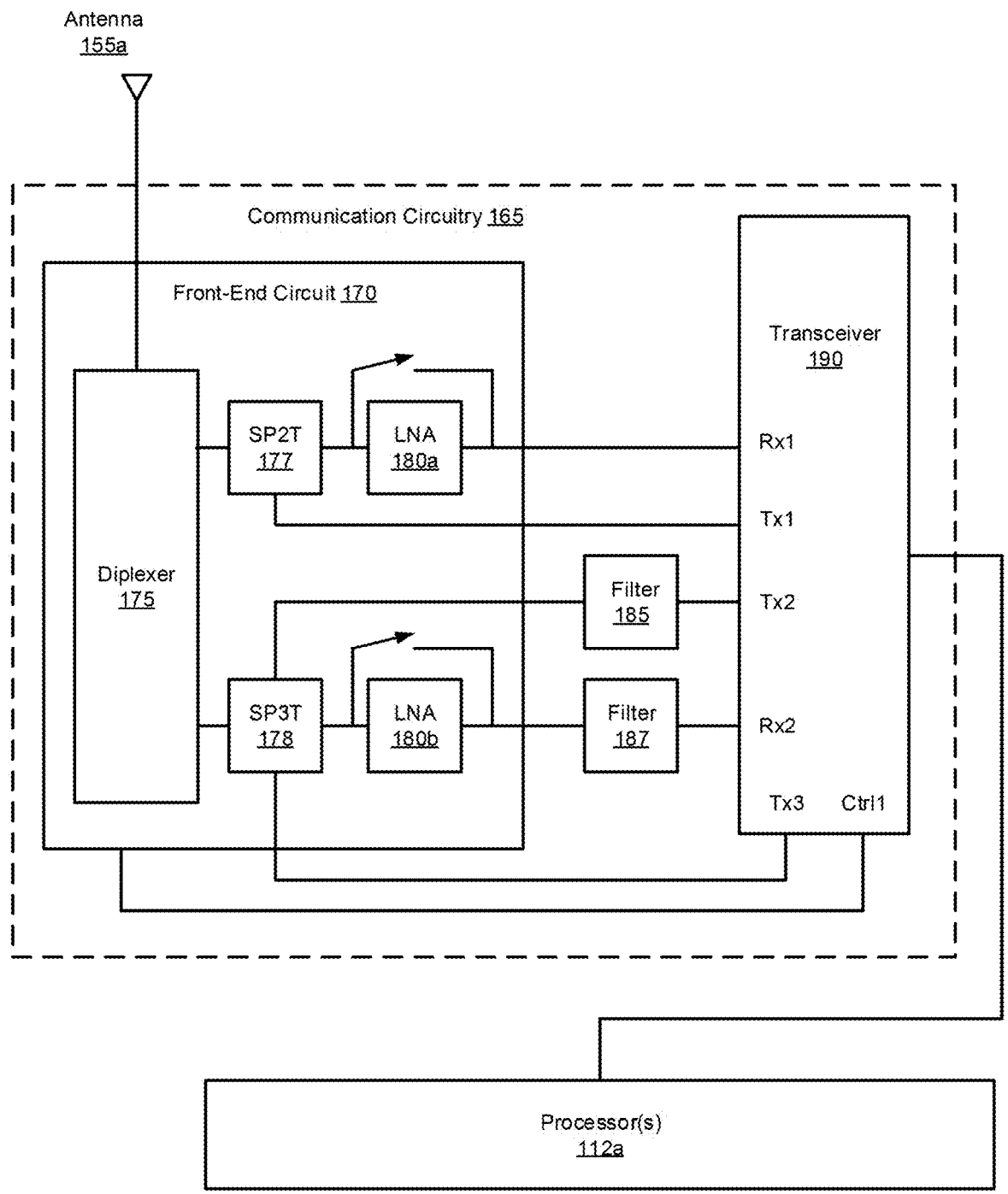
FIG. 1J illustrates an example communication system that includes communication circuitry configurations.

Further, in some embodiments, the wireless transceiver 190 may be implemented as a Multi-Input and Multi-Output (MIMO) transceiver (e.g., a 2×2 MIMO transceiver, 3×3 MIMO transceiver, 4×4 MIMO transceiver, etc.) instead of a Single-Input-Single-Output (SISO) transceiver as shown in FIG. 1J. In such an implementation, the front-end circuit 170 may be duplicated for each additional concurrently supported transmit and/or receive signal chain supported by the MIMO transceiver. For instance, the communication circuitry 165 may comprise three front-end circuits 170 for a 3×3 MIMO wireless transceiver (one front-end circuit 170 for each supported transmit and/or receive signal chain). Further, in such MIMO transceiver implementations, the switching circuitry 160 may be removed in some cases. For instance, the switching circuitry 160 may be removed in cases where the number of antennas is equal to the number of supported concurrent transmit and/or receive signal chain (e.g., the switching circuitry 160 may be removed when using two antennas with a 2×2 MIMO transceiver). In other cases, the switching circuitry 160 may still be employed. For example, the communication system 150 may comprise six antennas and a 2×2 MIMO transceiver. In this example, the communication system 150 may still employ switching circuitry 160 to down select from the six antennas to the two antennas that may be coupled to the 2×2 MIMO transceiver at a given time.

IV. Example Systems and Devices

Figure 2A:
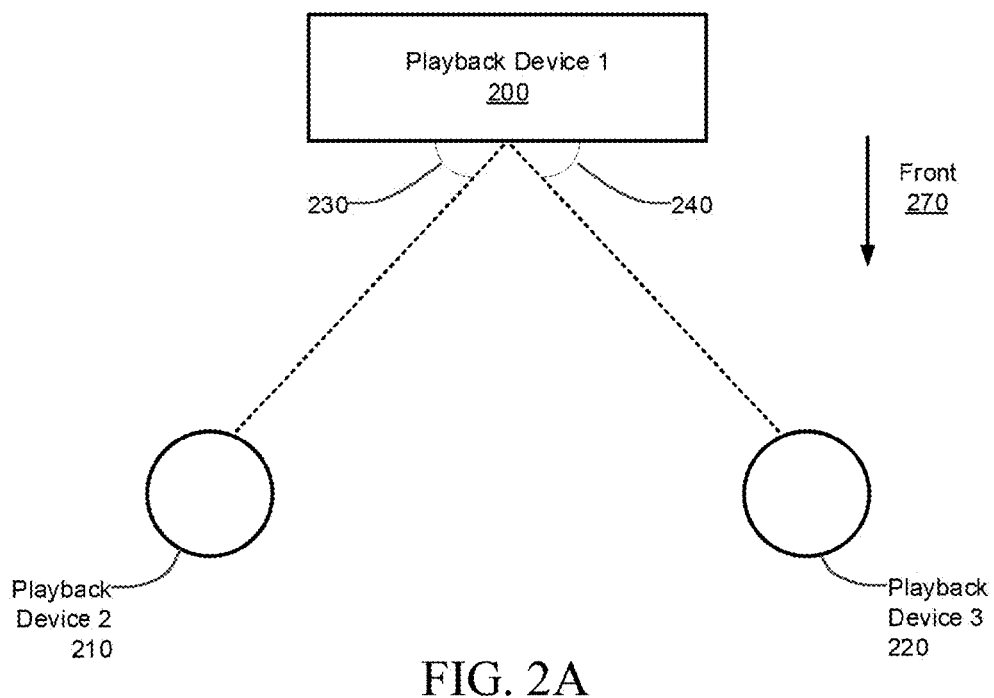
FIG. 2A illustrates an example configuration that includes three playback devices.

As discussed above, playback devices in a media playback system may comprise one or more wireless radios (e.g., an RF radio such as a UWB radio) that may be employed to determine a location of those playback devices relative to each other (e.g., a location of a first playback device relative to a second playback device). For instance, FIG. 2A illustrates an example configuration that includes three playback devices 200, 210, 220 positioned within a space (e.g., a room in a house, a product demonstration area within a store, etc.). The first playback device 200 may be a home theater or a soundbar, for example, while second and third playback devices 210 and 220 may be left and right satellite stereo speaker pairs, although other configurations are possible. For example, the first playback device 200 may be any playback device configured to receive multi-channel audio content. The first playback device 200 is shown to be front facing 270. In this example, the first playback device 200 applies AOA estimation techniques to RF signals that are transmitted from the second and third playback devices 210 and 220. The AOA estimation techniques are used to determine angles 230 and 240 to the second and third playback devices, relative to the first playback device. These angles 230, 240 may then be employed for any suitable purpose including, for example, determining which of playback devices 210 and 220 are the left speaker and the right speaker, allocating audio channels to those devices, performing acoustic tuning (e.g., frequency equalization, volume adjustments, etc.), providing synchronization between those devices, and/or facilitating setup of the audio system.

In some embodiments, the transmitted RF signals are UWB signals (e.g., signals characterized by a center frequency in the range of 7-9 GHz range and a bandwidth in the range of 400-600 MHz, or greater than 400 MHz).

Figure 2B:
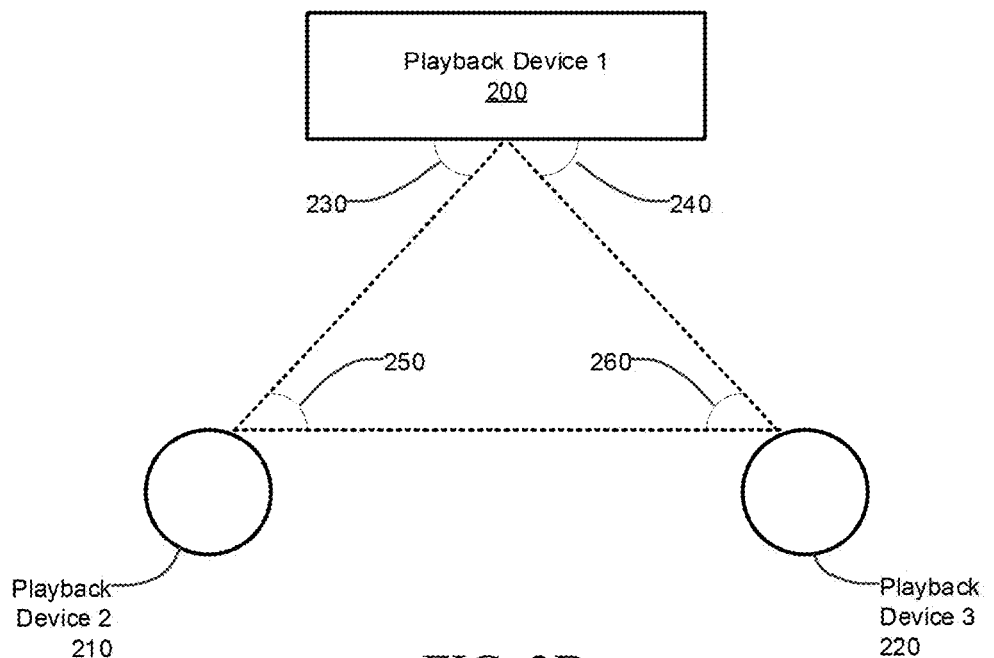
FIG. 2B illustrates another example configuration that includes three playback devices.

FIG. 2B illustrates another example configuration that includes three playback devices 200, 210, 220. In this example, all three playback devices are configured to employ AOA estimation techniques to RF signals that are transmitted between the devices such that additional angles 250 and 260 can be determined, either as an alternative to angles 230, 240 or as a supplement to those angles. In some embodiments, having additional angle estimates may improve estimation accuracy, for example by providing a discrepancy check or allowing for averaging to reduce error.

Figure 3:
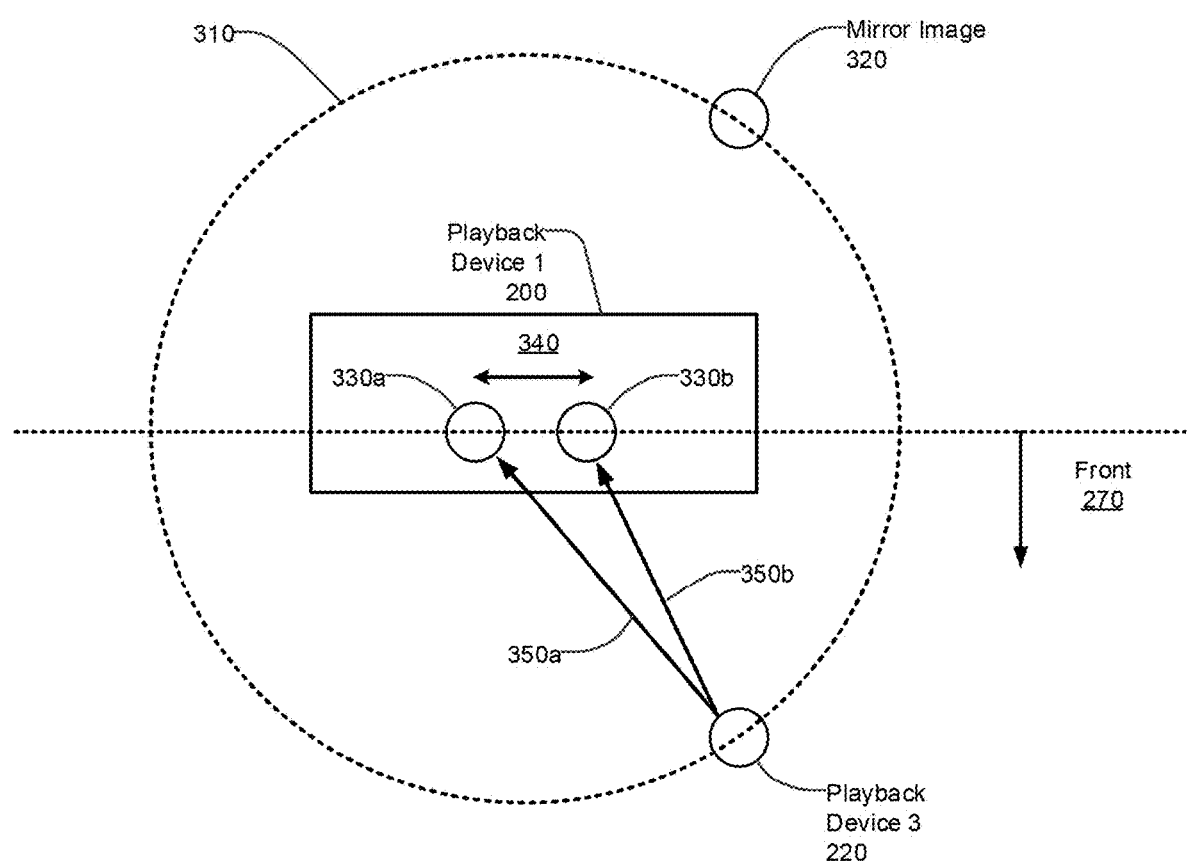
FIG. 3 illustrates an example of angle of arrival (AOA) estimation in accordance with aspects of the disclosed technology.

FIG. 3 illustrates an example of AOA estimation 300 in accordance with aspects of the disclosed technology. The first playback device 200 is shown to include two antennas 330a and 330b separated by a distance 340. These antennas each receive a signal, 350a, 350b respectively, that is transmitted from the third playback device 220. The relative phase difference between the two received signals 350a and 350b is measured and used to estimate the AOA 240 in a 2D plane. While the AOA 240 indicates the direction from the first playback device to the third playback device, there is an inherent ambiguity that results from the AOA estimation process in that the third playback device could be located at either the true position indicated in FIG. 3 or at the mirror image location 320. This ambiguity can be resolved in any of a variety of ways. For instance, the second and third playback devices may be assumed to be located in front 270 of the first playback device (instead of behind it). In another example, the two antennas 330a and 330b may be constructed and/or positioned in the playback device 200 so as to have a null area that overlaps with the mirror image 320 (e.g., directional antennas positioned to face the front 270). In yet another example, in some embodiments, the ambiguity could also be resolved through the use of additional AOA estimates 250, 260 if the second and third playback devices are configured with that capability.

The distance 340 between antennas 330a and 330b is selected to be a fraction of the wavelength of the RF signal, for example less than one half of the wavelength corresponding to the center frequency of the UWB signal. The choice of distance involves a tradeoff. Larger distances provide improved noise immunity, but as the distance exceeds half of the wavelength, the angular range over which valid AOA measurements can be obtained decreases.

In some embodiments, a third antenna may be employed to obtain AOA measurements in 3 dimensions, as described in greater detail below.

Figure 4:
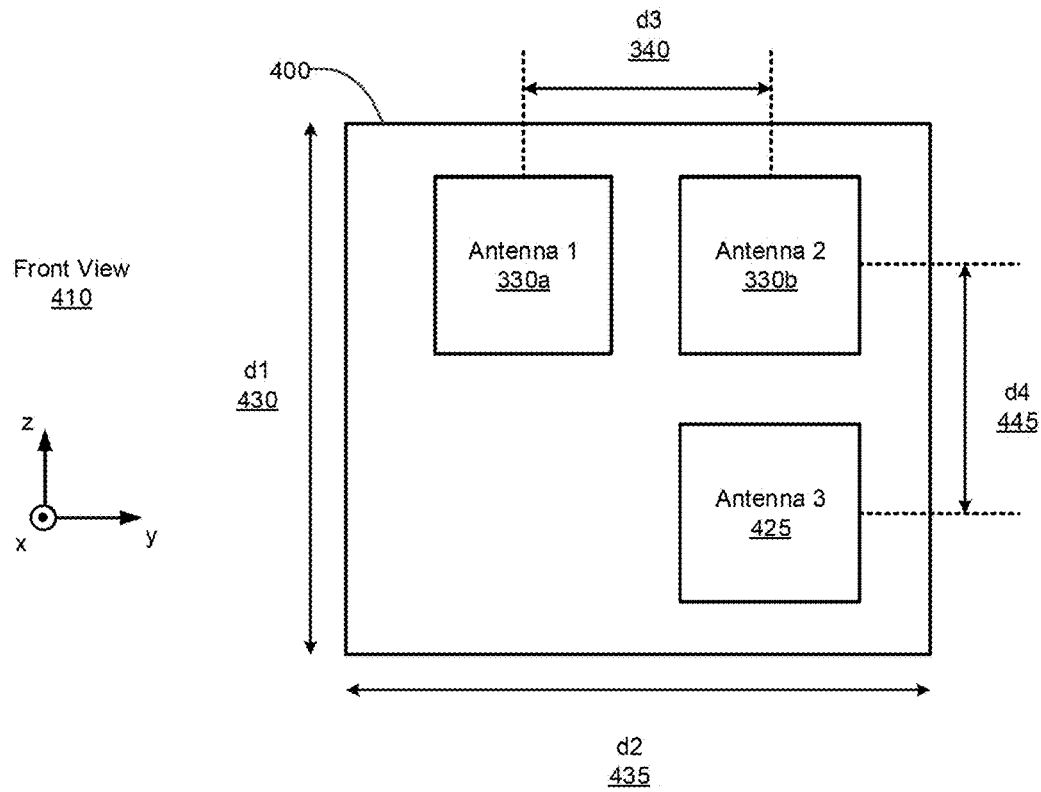
FIG. 4 illustrates a directional antenna array configured in accordance with aspects of the disclosed technology.
Figure 4:
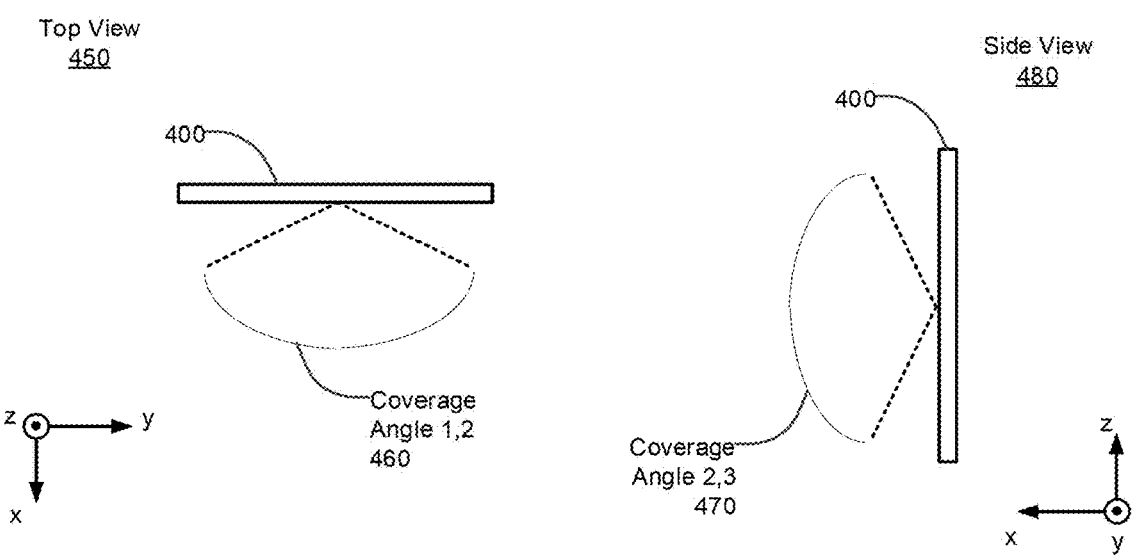

FIG. 4 illustrates a directional antenna array 400 configured in accordance with aspects of the disclosed technology. The directional antenna array 400 is shown to comprise first and second antenna elements 330a and 330b, which are shown in a front view 410 (with x, y, z axes as indicated). In some embodiments, a third antenna element 425 may also be included in the array to provide 3-dimensional AOA estimation. For example, measured phase difference between the first antenna element 330a and the second antenna element 330b can determine an AOA in the x/y plane, while measured phase difference between the second antenna element 330b and the third antenna element 425 can determine an AOA in the x/z plane. Combining these 2-dimensional AOAs provides a 3-dimensional AOA in the x/y/z space.

FIG. 4 also illustrates a top view 450 of the array 400 which shows an example directional coverage angle 460 of the first and second antenna elements. Side view 480 shows an example directional coverage angle 470 of the second and third antenna elements.

Antenna elements 330a and 330b are shown to be separated by distance d3 340. Antenna elements 330b and 425 are shown to be separated by distance d4 445. In some embodiments d4 may be equal to d3, although this is not required. The overall dimensions of directional antenna array 400 are shown as d1 430 by d2 435 and may correspond to the substrate or structure upon which the antenna elements 330a, 330b, and 425, are mounted.

In some embodiments, the antenna elements 330a, 330b, and 425 may be patch antennas. In some embodiments, the antenna elements may be linearly polarized (e.g., linearly polarized single-band or dual-band antennas) for applications where the antennas of all playback devices will be configured in a single common orientation (e.g., such that the linear polarization of a transmit antenna matches the linear polarization of a receive antenna). For applications where playback devices may be oriented in arbitrary positions (e.g., vertical or horizontal orientation), the antenna elements may be circularly polarized patch antennas.

Figure 5:
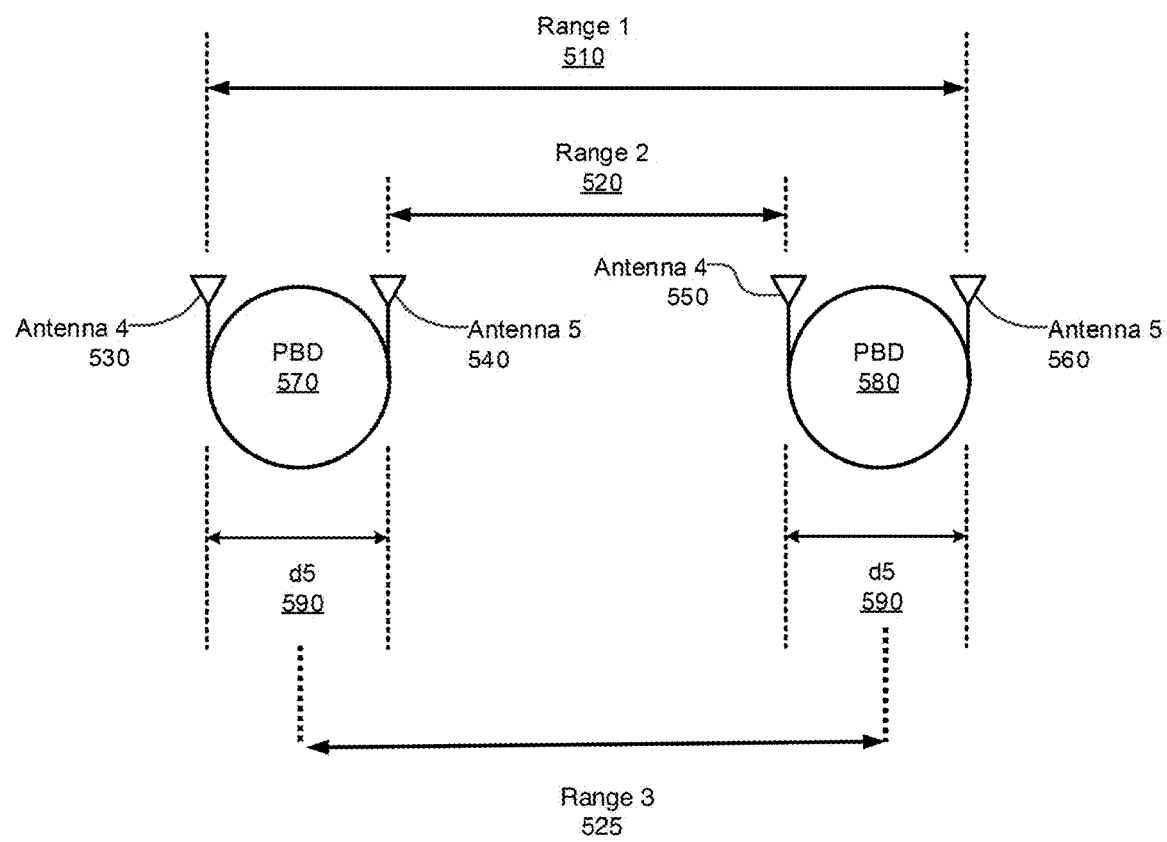
FIG. 5 illustrates an example of time of flight (ToF) estimation in accordance with aspects of the disclosed technology.

Having described how relative locations of playback devices may be determined using AOA measurements, it should be appreciated that the relative locations of playback devices may be determined using other types of measurements. In some embodiments, playback devices in a media playback system may (additionally or alternatively to AOA measurements) employ time-of-flight (ToF) measurements (e.g., one way ranging, two way ranging, etc.) to determine their location relative to each other. For instance, FIG. 5 illustrates an example of ToF estimation 500 in accordance with aspects of the disclosed technology. ToF estimation of a signal transmitted between two playback devices is equivalent to range estimation given that the signal speed is known (e.g., the speed of light, c). A first playback device 570 is shown to include two antennas 530 and 540 and a second playback device 580 is shown to include two antennas 550 and 560. Playback devices 570 and 580 may be any of the playback devices 200, 210, and 220 shown in FIGS. 2A and 2B and previously described. The antennas 530, 540, 550, and 560 are referred to as antennas 4 and 5 to indicate that they may be included as additional or alternative antennas to previously described antennas 1, 2, and 3. Antennas 4 and 5 are separated by a distance d5 590.

A first range 510 is calculated between the outer antennas (antenna 4, 530 of the first playback device 570 and antenna 5, 560 of the second playback device 580), based upon a ToF measurement of signal transmission between the playback devices. A second range 520 is calculated between the inner antennas (antenna 5, 540 of the first playback device 570 and antenna 4, 550 of the second playback device 580), based upon the signal ToF measurement. A third range 525 is the distance between centerlines of the first playback device 570 and the second playback device 580. If playback device 570 is located to the left of playback device 580, as shown in FIG. 5, then range 1 will be greater than range 2, and the difference between the ranges is expected to be approximately twice the antenna separation d5 590. Likewise, if playback device 570 is located to the right of playback device 580, then range 2 will be greater than range 1, by approximately twice the antenna separation d5 590. In this manner, ToF measurements, and in particular a time difference of arrival between two antennas on a playback device, can be used to determine the relative position of playback devices 570 and 580. Determination of relative position can then be used, for example, to discriminate between left and right speakers in a stereo pair, allocate audio channels to those devices, perform acoustic tuning (e.g., frequency equalization, volume adjustments, etc.), provide synchronization between those devices, and/or facilitate setup of the audio system.

In some embodiments, additional ranges can be calculated between antennas 530 and 550 and between antennas 540 and 560. These two additional ranges are expected to be approximately equal and thus could be used to detect possible measurement errors if they differ by more than a selected threshold amount.

In some embodiments, the signal transmission between playback devices is a UWB signal, as described previously. In some embodiments, antennas 4 and 5 are monopole antennas or other suitable antennas having relatively omnidirectional characteristics. In some embodiments, antennas 4 and 5 are etched endfire array antennas. In some embodiments, the antenna spacing d5 590 may be in the range of 35 to 45 mm. In some other embodiments, the antenna spacing d5 590 may be in the range of 90 to 110 mm.

Figure 6:
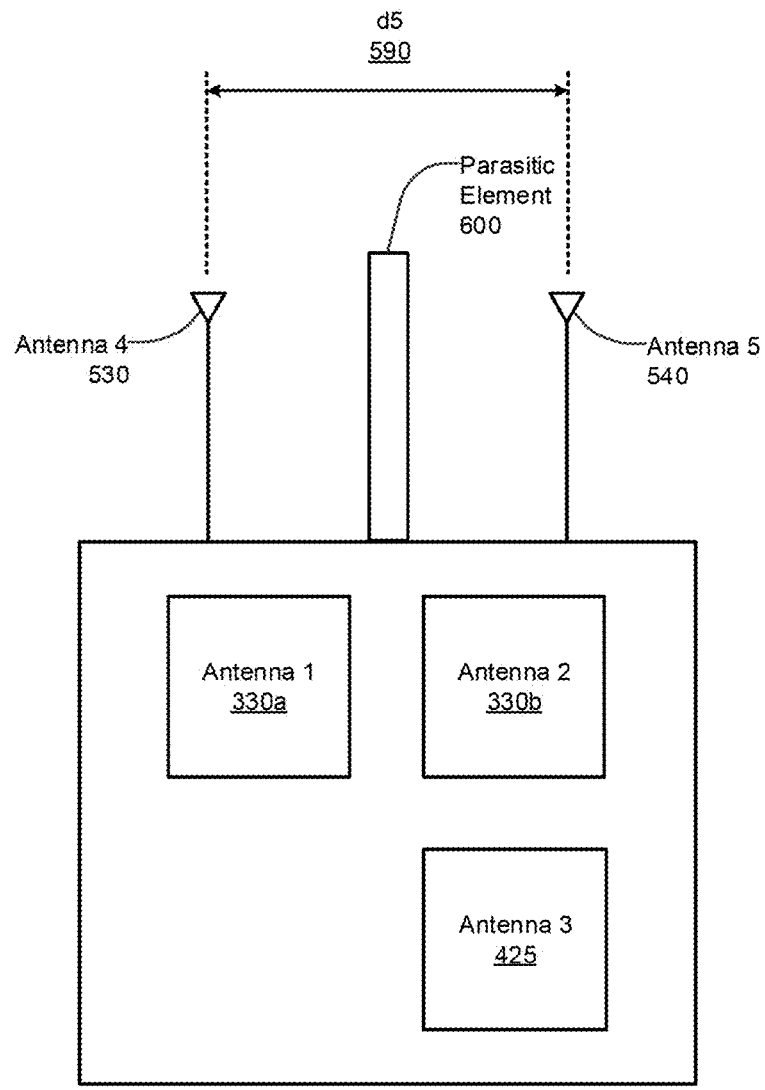
FIG. 6 illustrates an example playback device that includes five antennas configured in accordance with aspects of the disclosed technology.

FIG. 6 illustrates an example playback device that includes five antennas configured in accordance with aspects of the disclosed technology. Antennas 1-3: 330*a*, 330*b*, and 425, which may be directional patch antennas, are employed to perform AOA estimation as previously described. Antennas 4 and 5: 530 and 540, which may be relatively omnidirectional monopole antennas, are employed to perform ToF/Range estimation as previously described.

In this example, a parasitic element 600 is disposed between antennas 4 and 5 to induce a difference in received signal strength (e.g., power) between the left and right antennas. For example, a signal arriving from the left side will be received by antenna 5 in an attenuated state due to the parasitic element 600, while the signal received by antenna 4 will be relatively unaffected. In some embodiments, the received power difference between antennas may be on the order of 7 dB. This difference in signal strength may be employed as an additional indicator of the relative direction of the transmitting playback device relative to the receiving playback device. This additional indicator can replace or supplement the information provided by the ToF/Range estimation and may allow for closer spacing of antennas 4 and 5 (e.g., substantially less than 40 mm) which may be useful in smaller form factor playback devices.

Figure 7:
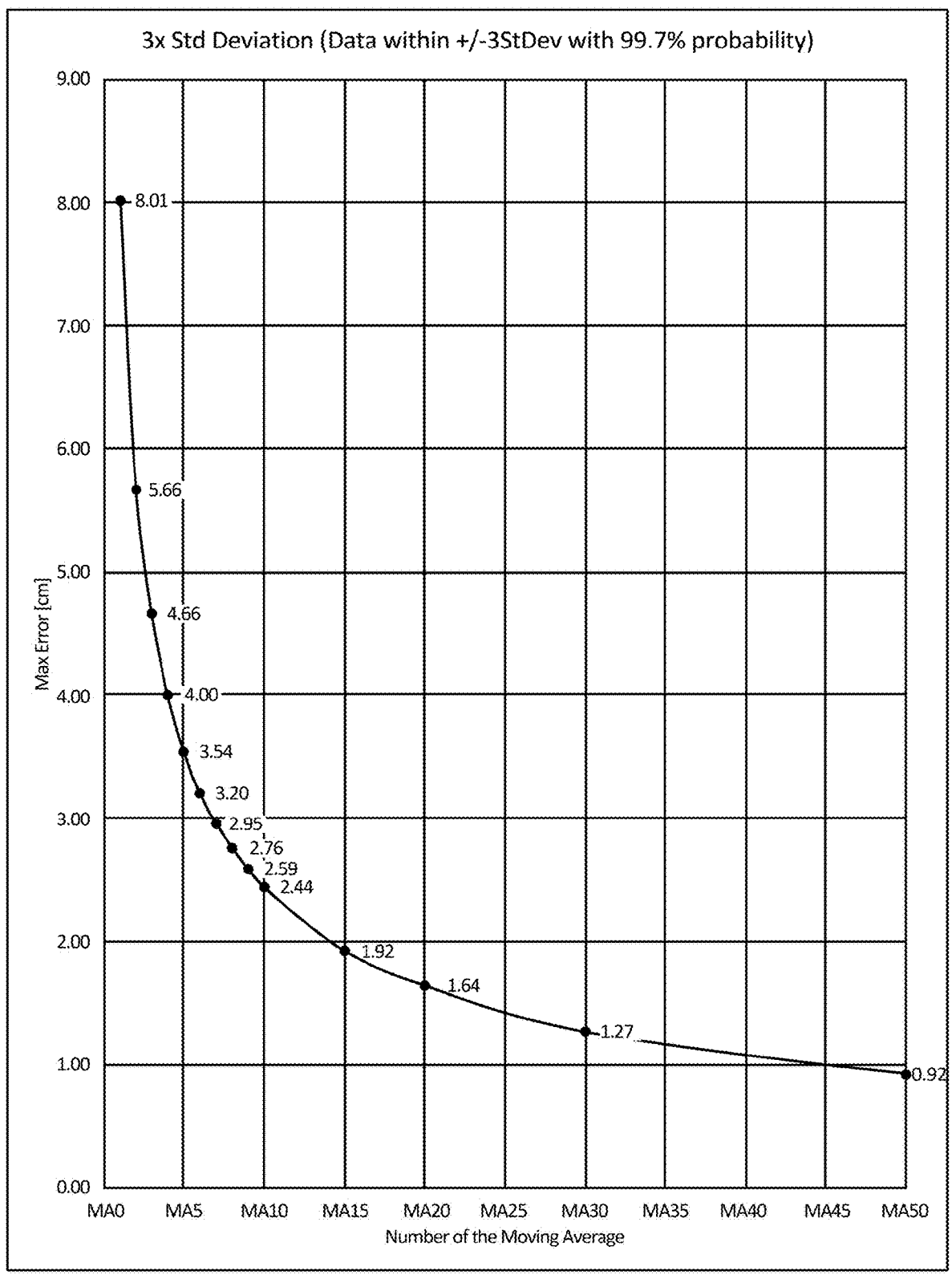
FIG. 7 is a plot of the range error versus the number of moving averages that are performed in accordance with aspects of the disclosed technology.

FIG. 7 is a plot of the range error (in cm) versus the number of moving averages (MAs) that are performed in accordance with aspects of the disclosed technology. Because ToF measurements are subject to noise, error is induced in the resulting range estimates. This error imposes a limit on how closely the antennas can be spaced. One way to reduce the error is to capture multiple range measurements and average (or otherwise filter) those values to mitigate the noise. This is illustrated in FIG. 7. As can be seen, the expected error (within three standard deviations) decreases from approximately 8 cm for a single measurement down to approximately 1 cm for an MA length of 50. The plot also shows that there is a knee in the curve, at an MA of approximately 10 to 15. Thus, in some embodiments, the MA length may be chosen to be greater than 10 or 15. In some embodiments, measurements may be performed until the average of those measurements yields a difference in range that exceeds a minimum threshold. The minimum threshold may be based on the antenna spacing. Generally, more measurements and averaging will be employed for playback devices having smaller spacing between the antennas given that the range difference is smaller relative to the measurement noise.

Figure 8:
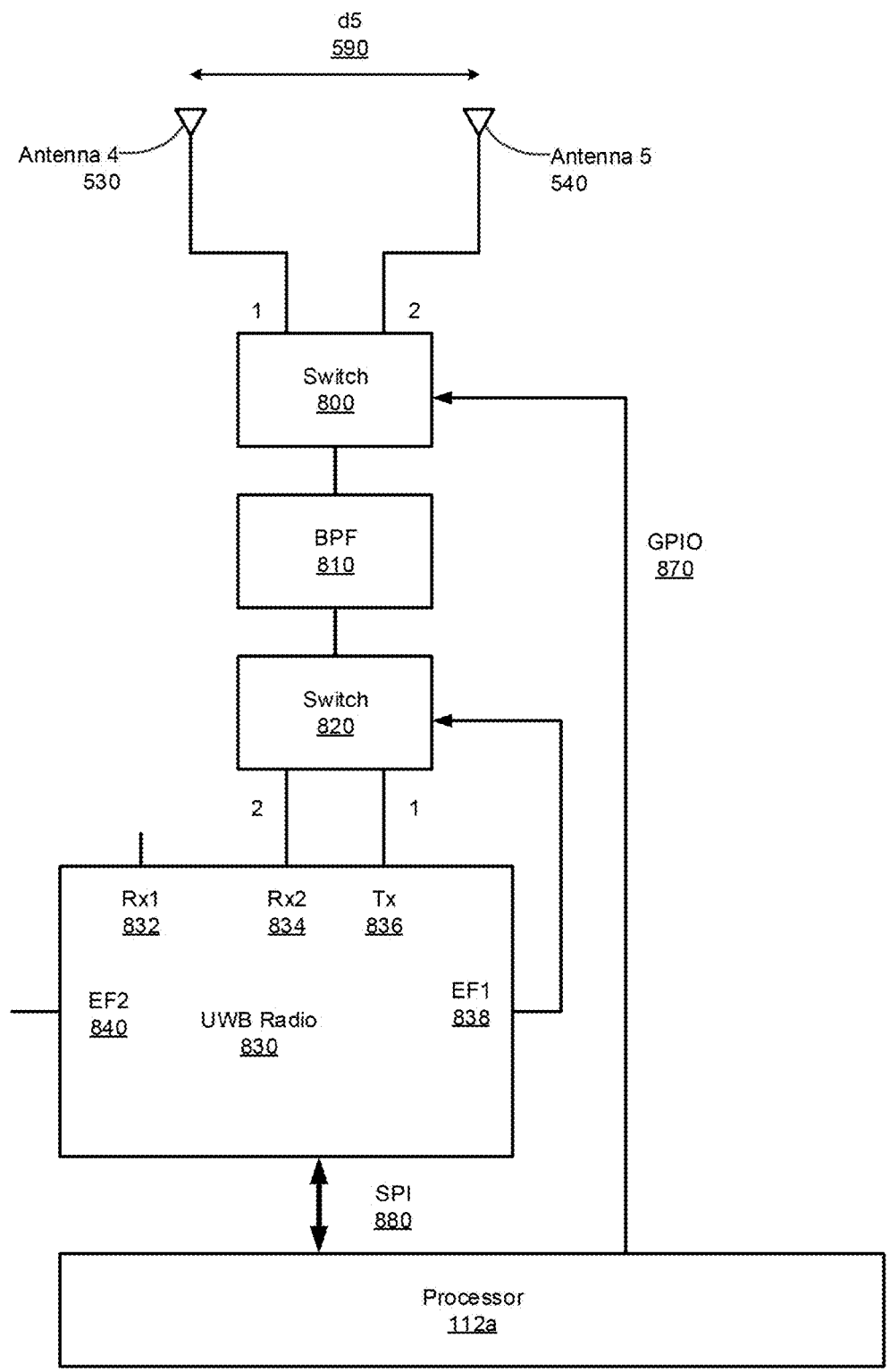
FIG. 8 illustrates a playback device configured to perform ToF/range estimation in accordance with aspects of the disclosed technology.

FIG. 8 illustrates a playback device configured to perform ToF/range estimation in accordance with aspects of the disclosed technology. Referring to FIG. 8, the playback device is shown to include fourth antenna 530, fifth antenna 540, first switch 800, second switch 820, BPF 810, UWB radio 830, and processor 112*a*. In some embodiments, the processor 112*a* is configured to communicate with the UWB radio 830 over a serial peripheral interface (SPI) bus. In some embodiments, the processor 112*a* is configured to control switch 800 over a general purpose I/O (GPIO) bus 870.

In some embodiments, UWB radio 830 is configured to selectively transmit or receive UWB signals, through either of antennas 530 or 540, under the control of processor 112*a*. In transmit mode, switch 820 is controlled, by a signal issued through port EF1 838, to couple transmit port 836 to the BPF 810. The filtered signal will be coupled to either antenna 530 or antenna 540 based on the setting of switch 800 which is controlled by a signal on GPIO bus 870 issued by processor 112*a*. Thus, an RF path can be established between the transmit port 836 and one of the antennas 530 or 540. The UWB radio 830 is further configured to accept a signal (e.g., a baseband signal) from the processor 112*a* (e.g., over the SPI bus 880), and generate an RF UWB signal for transmission through either antenna 530 or 540.

In receive mode, switch 820 is controlled, by a signal issued through port EF1 838, to couple receive port 834 to the BPF 810. Additionally, either antenna 530 or antenna 540 is coupled to the BPF 810 based on the setting of switch 800 which is controlled by a signal on GPIO bus 870 issued by processor 112*a*. Thus, an RF path is established between the receive port 834 and one of the antennas 530 or 540. The UWB radio 830 is also configured to convert received RF UWB signals to baseband and provide the baseband signals to the processor 112*a* (e.g., over the SPI bus 880). The UWB radio 830 is further configured to provide ToF and/or time difference of arrival (TDOA) measurements of the signals, received through the antennas, to the processor 112*a*.

Figure 9:
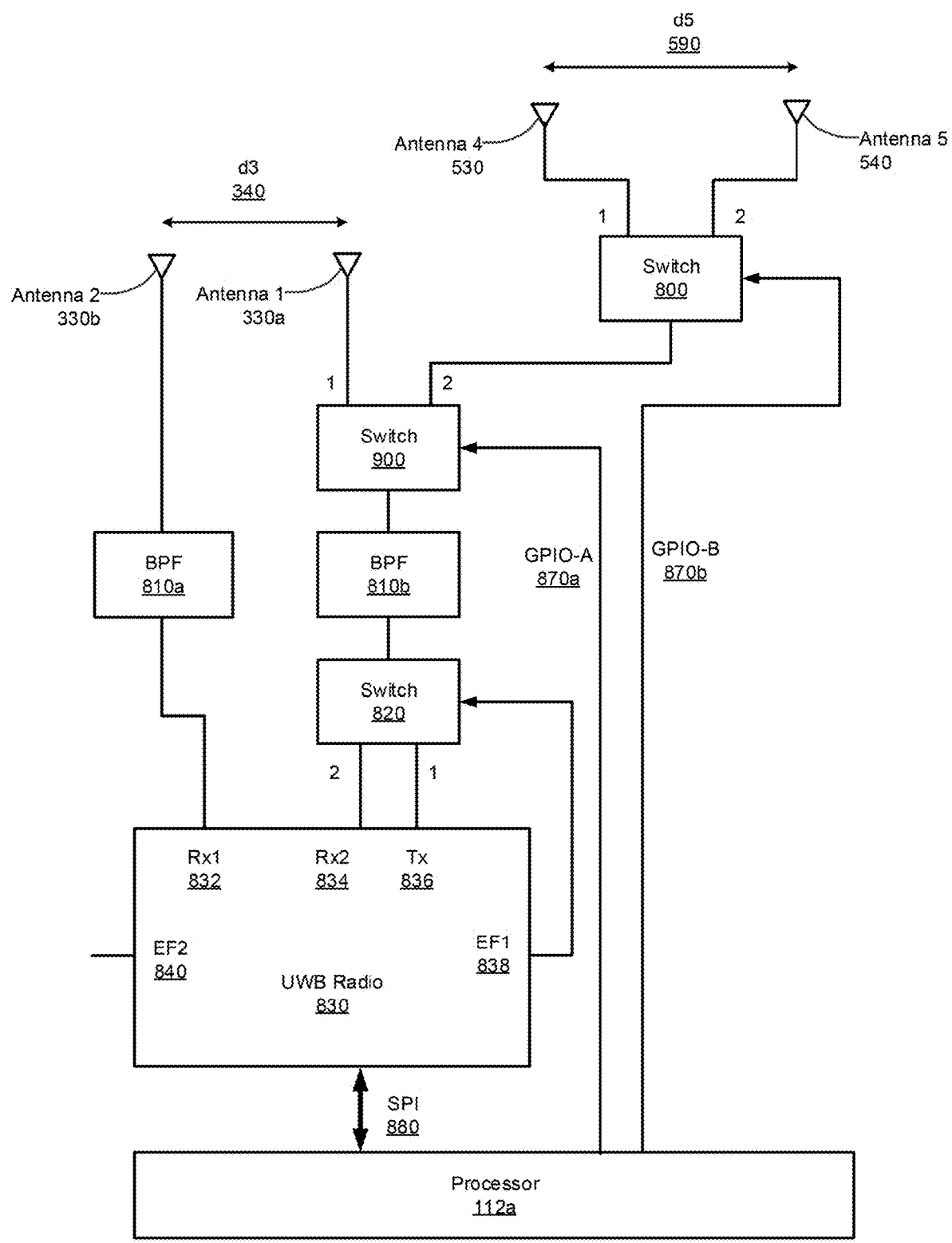
FIG. 9 illustrates a playback device configured to perform either or both ToF/range estimation and 2-dimensional AOA estimation in accordance with aspects of the disclosed technology.

FIG. 9 illustrates a playback device configured to perform either or both ToF/range estimation and 2-dimensional AOA estimation in accordance with aspects of the disclosed technology. Referring to FIG. 9, the playback device is shown to include first antenna 330*a*, second antenna 330*b*, fourth antenna 530, fifth antenna 540, first switch 800, second switch 820, third switch 900, BPFs 810*a* and 810*b*, UWB radio 830, and processor 112*a*. In some embodiments, the processor 112*a* is configured to communicate with the UWB radio 830 over a serial peripheral interface (SPI) bus 880. In some embodiments, the processor 112*a* is configured to control switch 900 over a general purpose I/O (GPIO-A) bus 870*a* and to control switch 800 over a general purpose I/O (GPIO-B) bus 870*b*.

In some embodiments, UWB radio 830 is configured to selectively transmit or receive UWB signals, through any of antennas 330*a*, 530, and 540, and to receive UWB signals through antenna 330*b*. Switch 800 allows for the selection of either antenna 530 or antenna 540, as controlled by GPIO-B signal 870*b* issued by processor 112*a*. Switch 900 allows for the selection of either the antenna group 530 and 540 or of antenna 330*a*, as controlled by GPIO-A signal 870*a* issued by processor 112*a*. The antenna group 530 and 540 may be used for ToF and/or TDOA measurements, while antenna 330*a* may be used in combination with antenna 330*b* for AOA measurement. Switch 820 determines whether the selected antenna (from the group of 330*a*, 530, and 540) is used for transmit mode (through transmit port 836) or receive mode (through receive port 834), based on a signal issued through port EF1 838. BPF 810*b* is configured to provide any desired filtering of the signals that pass between switch 820 and switch 900. Thus, an RF path can be established between either the receive port 834 or the transmit port 836 and any one of the antennas 330*a*, 530, or 540, so that any of these 3 antennas can be used for either signal reception or transmission at different times.

Additionally, antenna 330*b* is coupled to receive port 832 of the UWB radio through BPF 810*a*, which allows for simultaneous reception of signals through antennas 330*a* and 330*b*, for AOA estimation, given an appropriate selection of switching states of switches 820 and 900 (e.g., switch 900 set to state 1 and switch 820 set to state 2).

The UWB radio 830 is configured to provide ToF and/or TDOA measurements of the signals, received through antennas 530 and 540, to the processor 112*a*. The UWB radio 830 is further configured to provide AOA measurements of the signals, received through antennas 330*b* and 330*a*, to the processor 112*a*.

Figure 10:
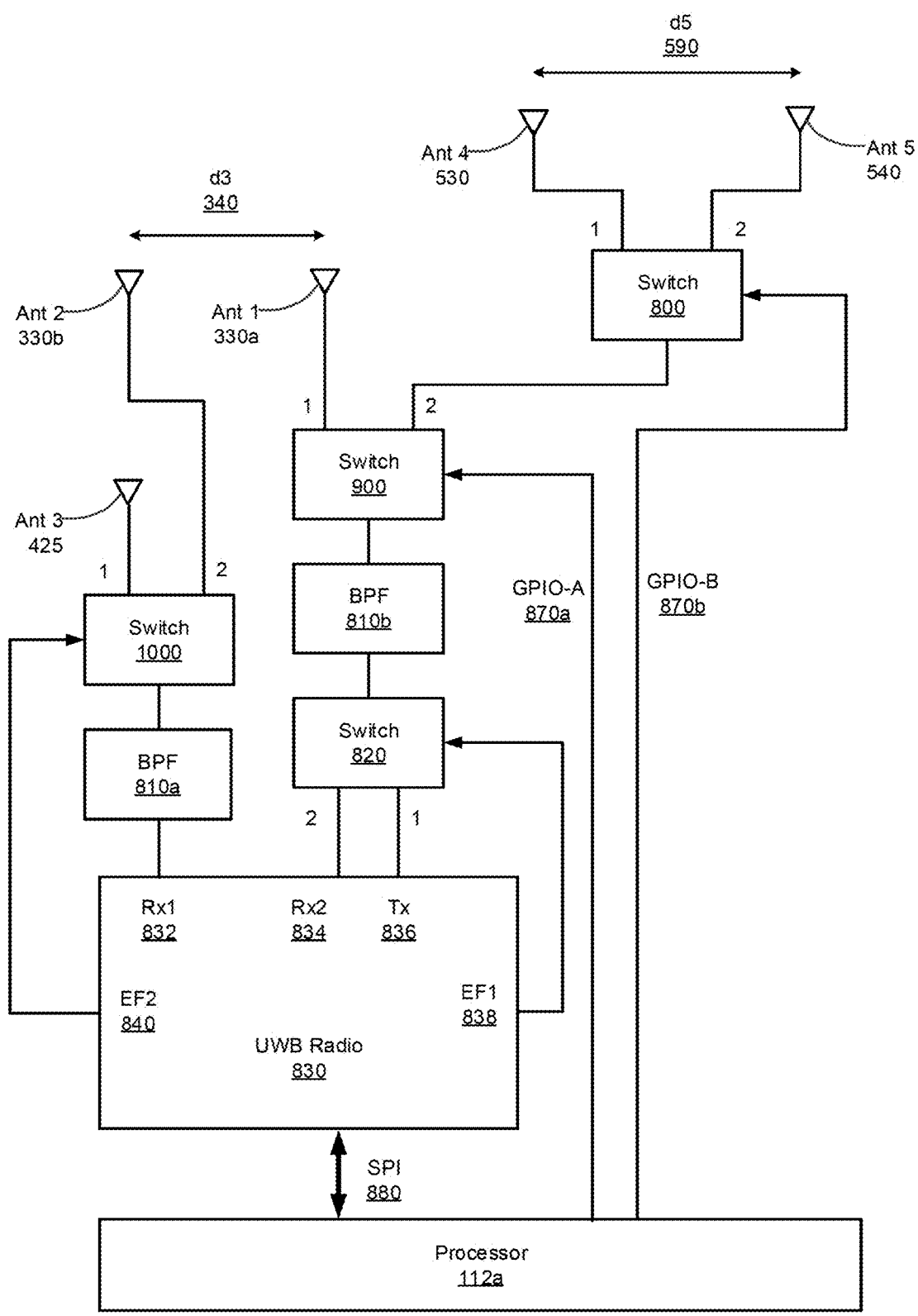
FIG. 10 illustrates a playback device configured to perform both ToF/range estimation and 3-dimensional AOA estimation in accordance with aspects of the disclosed technology.

FIG. 10 illustrates a playback device configured to perform both ToF/range estimation and 3-dimensional AOA estimation in accordance with aspects of the disclosed technology. Referring to FIG. 10, the playback device is shown to include first antenna 330a, second antenna 330b, third antenna 425, fourth antenna 530, fifth antenna 540, first switch 800, second switch 820, third switch 900, fourth switch 1000, BPFs 810a and 810b, UWB radio 830, and processor 112a. In some embodiments, the processor 112a is configured to communicate with the UWB radio 830 over a serial peripheral interface (SPI) bus 880. In some embodiments, the processor 112a is configured to control switch 900 over a general purpose I/O (GPIO-A) bus 870a and to control switch 800 over a general purpose I/O (GPIO-B) bus 870b.

In some embodiments, UWB radio 830 is configured to selectively transmit or receive UWB signals, through any of antennas 330a, 530, and 540, and to receive UWB signals through either of antennas 330b and 425. Switch 800 allows for the selection of either antenna 530 or antenna 540, as controlled by GPIO-B signal 870b issued by processor 112a. Switch 900 allows for the selection of either the antenna group 530, 540 or of antenna 330a, as controlled by GPIO-A signal 870a issued by processor 112a. The antenna group 530 and 540 may be used for ToF and/or TDOA measurements, while antenna 330a may be used in combination with antenna 330b for AOA measurement. Switch 820 determines whether the selected antenna (from the group of 330a, 530, and 540) is used for transmit mode (through transmit port 836) or receive mode (through receive port 834), based on a signal issued through port EF1 838. BPF 810b is configured to provide any desired filtering of the signals that pass between switch 820 and switch 900. Thus, an RF path can be established between either the receive port 834 or the transmit port 836 and any one of the antennas 330a, 530, or 540, so that any of these 3 antennas can be used for either signal reception or transmission at different times.

Additionally, antennas 330b and 425 are coupled to receive port 832 of the UWB radio through switch 1000 and BPF 810a, which allows for simultaneous reception of signals through antenna 330a and either of antennas 330b or 425, for 3-dimensional AOA estimation, given an appropriate selection of switching states of switches 820, 900, and 1000 (e.g., switch 900 set to state 1, switch 820 set to state 2, and switch 1000 set to either state 1 for antenna 425 or state 2 for antenna 330b). Switch 1000 is controlled by a signal issued through port EF2 840.

The UWB radio 830 is configured to provide ToF and/or TDOA measurements of the signals, received through antennas 530 and 540, to the processor 112a. The UWB radio 830 is further configured to provide 3-dimensional AOA measurements of the signals, received through antenna pairs (330a, 330b) and (330a, 425), to the processor 112a.

In some embodiments, the playback devices illustrated in FIGS. 8-10 may include additional radios (not shown), including additional UWB radios and/or radios configured for BLUETOOTH and/or WI-FI transmission and reception. It should be noted that the various switching configurations described above are examples and that numerous other configurations are possible.

In some embodiments, the UWB radio or one of the additional radios may be used to transmit instructions from one playback device to other playback devices. The instructions may include instructions to set playback configurations, for example to select channels from multi-channel audio content or for any other suitable purpose.

V. Suitable Distance Measurement Methods

Figure 11:
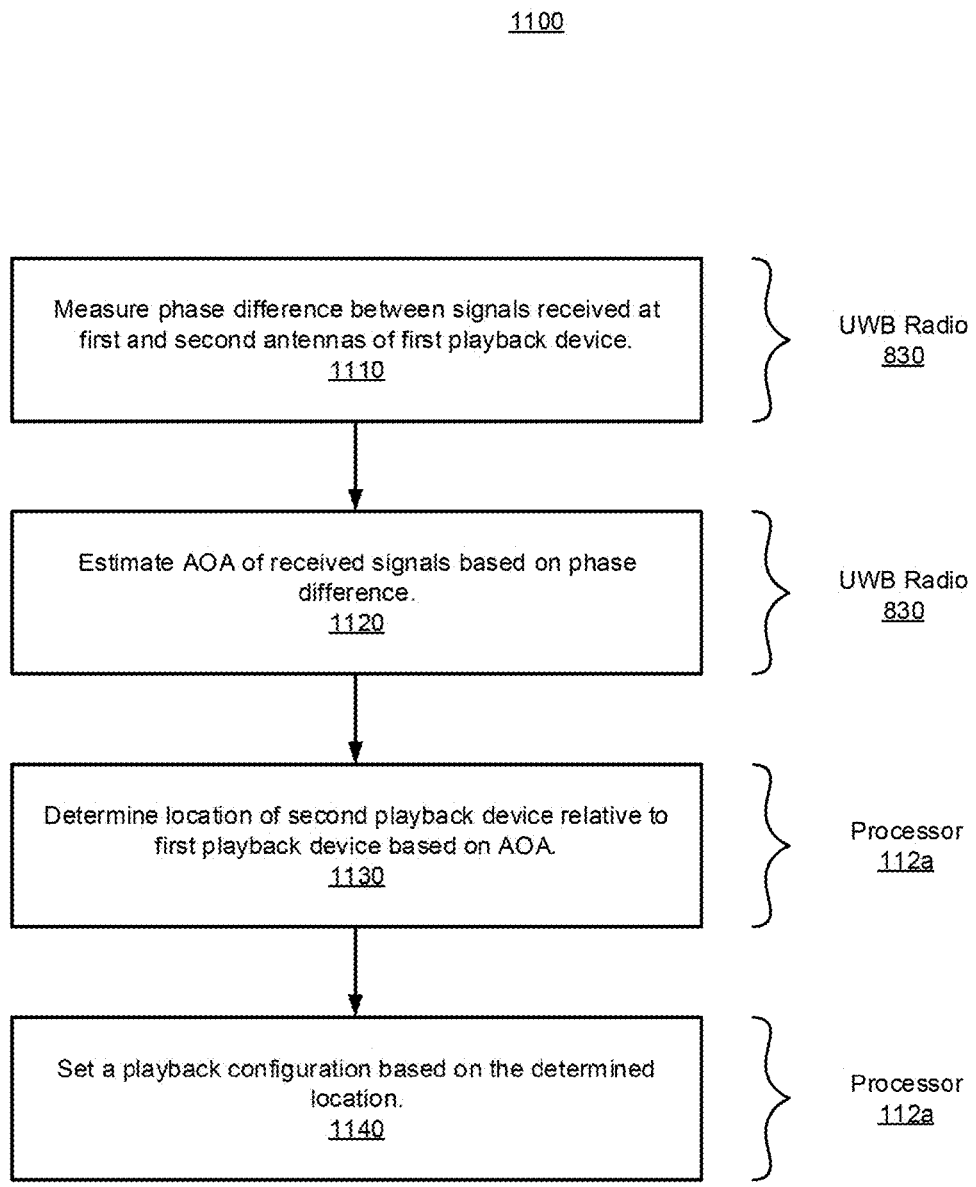
FIG. 11 shows an example embodiment of a method for a playback device to discriminate between other playback devices, based on AOA estimation techniques in accordance with aspects of the disclosed technology.

FIG. 11 shows an example embodiment of a method 1100 for a playback device employing a UWB radio to discriminate between other playback devices, based on AOA estimation techniques in accordance with aspects of the disclosed technology. As discussed above, the ability to discriminate between other playback devices, and to determine their relative locations and distances, can be used for a number of purposes including, for example, to discriminate between left and right speakers in a stereo pair, allocate audio channels to those devices, perform acoustic tuning, provide synchronization between those devices, and/or facilitate setup of the audio system. For example, determining that a first playback device is located to the left of a second playback device enables the first playback device to be designated as a left speaker of a stereo pair and eliminates the need for a user to manually provide such information during system setup. Additionally, acoustic tuning, which may include the setting of equalization parameters, may depend on the locations of the playback devices. For example, the audio from a playback device which is located near a wall or in a corner of a room may benefit from specific equalization adjustments tailored to that location.

Method 1100 can be implemented by any of the playback devices (e.g., devices 200, 210, or 220) disclosed herein, individually or in combination with any of the computing systems (e.g., computing system(s) 106) and/or user devices (e.g., user devices 130) disclosed herein, or any other computing system(s) and/or user device(s) now known or later developed.

Method 1100 begins at block 1110, which includes measuring a phase difference between a signal received at a first antenna and a second antenna of a wireless radio of the playback device (e.g., a first playback device). The signal may be transmitted from another (e.g., a second) playback device. In some embodiments, the measurement may be performed by the UWB radio.

At block 1120, method 1100 further includes estimating an angle of arrival of the signal to the first playback device based on the measured phase difference. In some embodiments, the estimation may be performed by the UWB radio.

At block 1130, method 1100 further includes determining a location of the second playback device relative to the first playback device based on the angle of arrival. In some embodiments, the determination may be performed by a processor of the first playback device.

At block 1140, method 1100 further includes, after a determination of the location of the second playback device relative to the first playback device, operating in a first playback configuration where the first playback device plays back one or more first channels of multi-channel audio content. The process may be repeated for signals received from additional playback devices to determine the relative locations of third, fourth, etc. playback devices. In some embodiments, the playback configuration may be set by a processor of the first playback device and may be based on the determined location of the second playback device relative to the first playback device.

In some embodiments, the method 1100 further includes, measuring a phase difference between a signal received at the second antenna and a third antenna of the wireless radio to estimate an additional AOA in a third dimension (e.g., a dimension orthogonal to the dimension of the first estimated AOA). The additional AOA is then used with the first AOA to determine the location of the second playback device relative to the first playback device in three dimensions (e.g., a position on the floor of the room as well as the height above the floor).

In some embodiments, the method 1100 further includes, while operating in the first playback configuration, playing back the one or more first channels of the multi-channel audio content in synchrony with playback of one or more second channels of the multi-channel audio content by the second playback device, as previously described. The one or more first channels may comprise at least one center channel and the one or more second channels may comprise at least one rear channel. In some embodiments, the method 1100 further includes identifying a second playback configuration for the second playback device to operate in based on the determined location of the second playback device relative to the first playback device and causing the second playback device to operate in the second playback configuration.

In some embodiments, the wireless radio of the first playback device (or a second wireless radio of the first playback device) may be used to transmit instructions to the second (or additional) playback devices. For example, the transmissions from the wireless radio may conform to an established format or specification that includes one or more fields for instructions that may be used for any suitable purpose. For example, the instructions may be used to identify playback configurations to be assigned to another playback device (e.g., telling another device that it is a right speaker or a left speaker and should therefore play back specified audio channels). As another example, the instructions may be used to set equalization values or volume levels for the other device.

Figure 12:
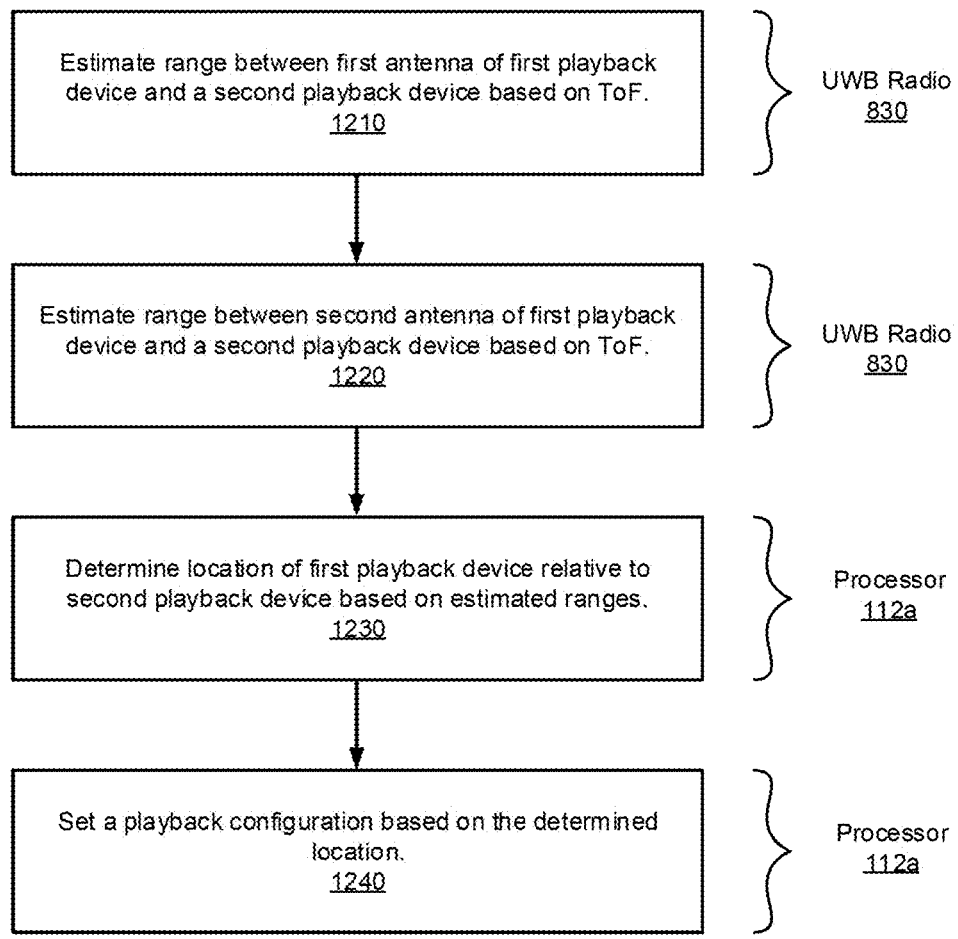
FIG. 12 shows an example embodiment of another method 1200 for a playback device to discriminate between other playback devices, based on ToF estimation techniques in accordance with aspects of the disclosed technology.

FIG. 12 shows an example embodiment of another method 1200 for a playback device employing a UWB radio to discriminate between other playback devices, based on ToF estimation techniques. Method 1200 can also be implemented by any of the playback devices (e.g., devices 200, 210, or 220) disclosed herein, individually or in combination with any of the computing systems disclosed herein, or any other computing system(s) and/or user device(s) now known or later developed.

Method 1200 begins at block 1210, which includes receiving a first signal at a first antenna of a wireless radio of a first playback device. The first signal may be transmitted from another (e.g., a second) playback device. Block 1210 further includes estimating a first range between the first antenna and the second playback device based on the first signal. In some embodiments, the estimation may be performed by the UWB radio.

At block 1220, method 1200 further includes receiving a second signal at a second antenna of the wireless radio of the first playback device. The second signal may be transmitted from the second playback device. Block 1220 further includes estimating a second range between the second antenna and the second playback device based on the second signal. In some embodiments, the estimation may be performed by the UWB radio. In some embodiments, the first range is between the first antenna and a first point on the second playback device and the second range is between the second antenna and a second point on the second playback device different from the first point.

At block 1230, method 1200 further includes determining a location of the first playback device relative to the second playback device based on the first range and the second range. In some embodiments, the determination may be performed by a processor of the first playback device.

At block 1240, method 1200 further includes after a determination of the location of the first playback device relative to the second playback device, operating in a first playback configuration where the first playback device plays back one or more first channels of multi-channel audio content. The process may be repeated for signals received from additional playback devices to determine the relative locations of third, fourth, etc. playback devices. In some embodiments, the playback configuration may be set by a processor of the first playback device and may be based on the determined location of the first playback device relative to the second playback device.

In some embodiments, the method 1200 further includes, while operating in the first playback configuration, playing back the one or more first channels of the multi-channel audio content in synchrony with playback of one or more second channels of the multi-channel audio content by the second playback device. In some embodiments, the multi-channel audio content is stereo content comprising a left channel and a right channel, and the one or more first channels comprises the left channel, and the one or more second channels comprise the right channel.

In some embodiments, the method 1200 further includes determining a time of flight of the first signal based on a timestamp encoded in the first signal and estimating the first range based on the time of flight.

In some embodiments, the method 1200 further includes identifying a difference in signal to noise ratio (SNR) between the first signal and the second signal and determining the location of the first playback device relative to the second playback device based on the difference in SNR.

VI. Example Methods

Figure 13:
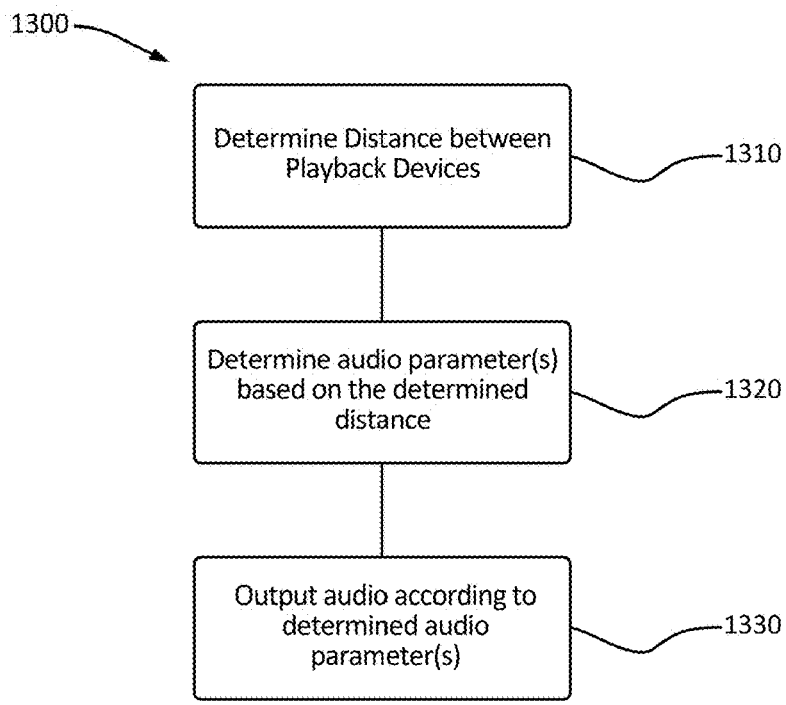
FIG. 13 is a flow diagram of another method 1300 for one or more playback devices to determine distances therebetween and adjust audio parameters correspondingly in accordance with aspects of the disclosed technology.

FIG. 13 shows an example of another method 1300 performed via a playback device (e.g., one or more of the playback devices 110 discussed above, such as playback device 110*a*) and/or a media playback system (e.g., the media playback system 100 of FIG. 1B) for determining a separation distance(s) between one or more playback devices and adjusting one or more audio parameters accordingly. In some examples, the method 1300 can be implemented by any of the playback devices (e.g., devices 200, 210, or 220) disclosed herein, individually or in combination with any of the computing systems disclosed herein, or other suitable computing system(s) and/or suitable user device(s).

At block 1310, the method 1300 includes determining a distance (e.g., range 525 of FIG. 5) between playback devices (e.g., the first playback device 570 and the second playback device 580 of FIG. 5). In some examples, method 1300 may include using a speed-of-light modality that includes UWB as described above with respect to FIGS. 11 and 12, another radio frequency (RF) measurement approach, infrared, visible light, etc.

In some examples, the method 1300 may include a slower than speed-of-light modality including sound (e.g., audible sound, inaudible sound between about 18 kHz and about 25 kHz, ultrasound). For instance, to determine the range 525 between the first playback device 570 and the second playback device 580 (FIG. 5), the second playback device 580 can emit a predetermined waveform via one or more transducers (e.g., the transducers 114 of FIG. 1C). A portion of the emitted waveform can be received at the first playback device 570 via one or more microphones (e.g., the microphone(s) 115 of FIG. 1F) and used to calculate a time difference that can be used to determine the distance or range 525 between the first and second playback devices 570 and 580. In other examples, the first playback device 570 emits the predetermined waveform and the second playback device 580 receives a portion of the waveform. In some examples, both devices emit and receive predetermined waveforms successively or simultaneously. Additional details regarding sound-based distance determination techniques can be found, for example, in U.S. Pat. No. 10,277, 981 entitled, "Systems and methods of user localization," which is incorporated herein by reference in its entirety.

In certain examples, the range 525 is determined using a combination of speed-of-light and slower than speed-of-light techniques. A speed-of-light measurement approach such as UWB is expected to be highly accurate at distances of 1 m or greater. As those of ordinary skill in the art will appreciate, however, very small separation distances (e.g., less than 1 meter, less than 30 cm, less than 10 cm, less than 5 cm) may present challenges with a transmission speed so high. UWB signals, for instance, take 0.00000000033 (i.e., $3.3 \times 10^{-9}$) seconds to travel 10 cm. The resolution needed to resolve such miniscule times and short distances may be beyond the capabilities of a standard UWB receiver. Sound, on the other hand, travels 10 cm in only about one-third of a millisecond, which may be within the operational accuracy of a standard slower than speed-of-light measurement system (e.g., a sound-based system). Accordingly, using a combination of a speed-of-light approach and a slower than speed-of-light approach may lead to a more accurate distance determination over a large range of separation distances. In some examples, the slower than speed-of-light approach comprises outputting audio (e.g., one or more calibration tones, pre-existing media content) via one of the playback devices (e.g., a second playback device of the stereo pair) and receiving at least a portion of the audio output via one or more microphones of another device (e.g., a first playback device of the stereo pair).

At block 1320, the method 1300 includes adjusting one or more audio output parameters based on the distance between devices determined at block 1310. In some examples, adjusting the one or more audio output parameters comprises matching the determined distance to one or more predetermined filter characteristics, coefficients, etc. in a lookup stored locally (e.g., on a local device) and/or remotely (e.g., on one or more cloud servers). In some examples, adjusting one or more audio output parameters can include adjusting a filter configured to attenuate sound below a threshold frequency (e.g., 50 Hz, 100 Hz, 150 Hz, 200 Hz, 250 Hz, 500 Hz, 1 kHz). As discussed above, when two devices are in a stereo pair, a low frequency shelf filter can be applied to both devices to reduce bass output compared to how each device would be tuned for mono playback. The low frequency shelf filter is applied because, at these low frequencies, bass audio from each device can add together coherently. Without this filter, the low frequency energy would increase in a way that would result in more bass than is desired for a given tuning. In some examples, for instance, based on the distance between two or more playback devices in a zone group and/or a bonded zone (e.g., stereo pair, home theater) configuration, a filter is adjusted such that the bass output from the combined stereo pair more closely aligns to the mono bass output from a single device. As discussed below with respect to FIG. 14, a filter (e.g., a low frequency shelf filter) may be configured to normalize the combined bass output from the devices to be within approximately plus or minus 3 dB of the measured or estimated mono bass output from a single device, based on parameters such as, for instance, distance between the devices, listener location(s) and/or acoustical characteristics of the listening environment. This approach is expected to provide several advantages over conventional approaches for at least the reason that in conventional media playback systems, a low frequency shelf filter may be applied to all devices in a stereo pair configuration, regardless of placement or distance therebetween. As those of ordinary skill in the art will appreciate, however, the level of low frequency energy that sums coherently, however, can be strongly dependent on the spacing between the stereo devices. FIG. 15, for instance, shows examples of playback device separation and varying frequency responses corresponding thereto. Thus a static low frequency filter may reduce bass output too much or too little to address the coherent addition of the low frequency output.

In some examples, other audio parameters are adjusted after the distance between devices is determined. The audio parameters can include volume, equalization settings, time delays, etc. In certain examples, for instance, high frequency output may be adjusted after the distance is determined. High frequency sound is not typically as directional or as affected by the coherent addition phenomena associated with low frequency sound discussed above. However, high frequency output via devices having arrays of transducers, including multiple tweeters, may be adversely affected if the devices are placed too close together or too close to an object or barrier (e.g., a wall). In some examples, for instance, if a first device (e.g., the first playback device 570 of FIG. 5) having left and right tweeters is placed excessively close (e.g., less than about 10 cm) to a second device (e.g., the second playback device 580 of FIG. 5) having left and right tweeters, high frequency output via adjacent tweeters (e.g., the right tweeter of the first device and the left tweeter of the second device) may be adversely affected by being in such relatively close proximity. In such scenarios, the method 1300 may include adjusting audio output parameters on both devices such that audio output via the adjacent tweeters is significantly reduced or turned off altogether (e.g., only the left tweeter of the first device and the right tweeter of the second device output audio).

In some examples, the playback devices comprise two or more subwoofers and the method of 1300 includes using the distance determined at block 1310 and typical listener location(s) to time and phase align low frequency output to provide more desirable bass via the two or more subwoofers.

At block 1330, the method 1300 includes outputting audio via the individual playback devices according to the one or more audio output parameters adjusted at block 1320.

Figure 14:
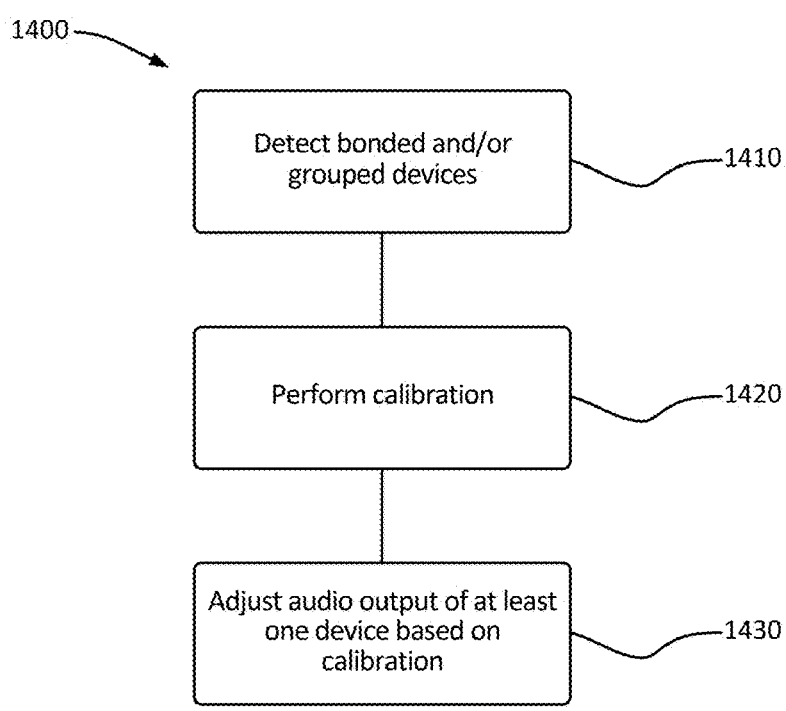
FIG. 14 is a flow diagram of another method 1400 for one or more playback devices to determine one or more adjusted audio parameters in accordance with aspects of the disclosed technology.
Figure 15:
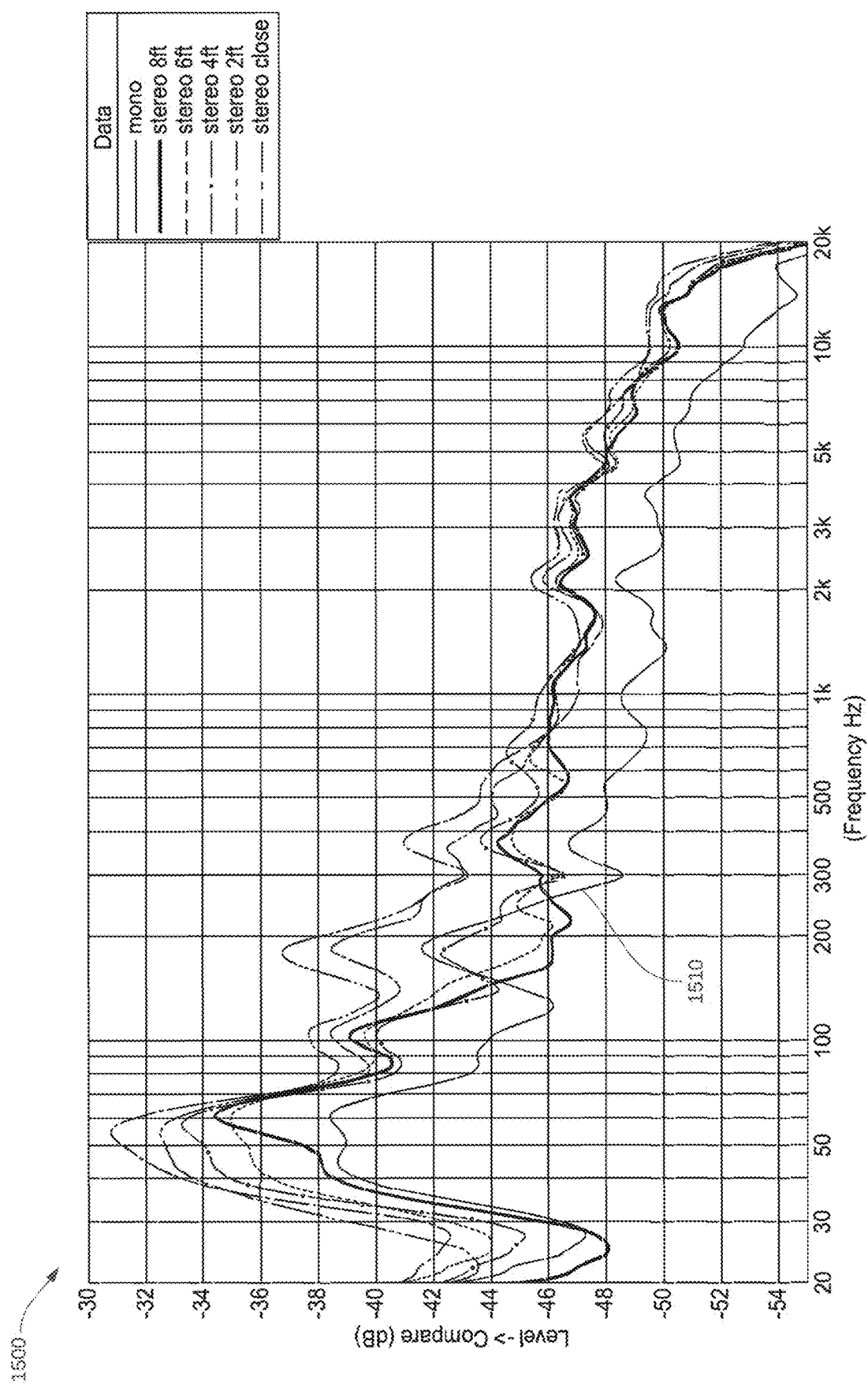
FIG. 15 is a graph showing frequency response plots for a pair of playback devices separated by varying distances.

FIG. 14 shows an example of a method 1400 performed via a playback device (e.g., one or more of the playback devices 110 discussed above, such as playback device 110*a*) and/or a media playback system (e.g., the media playback system 100 of FIG. 1B) for adjusting one or more audio parameters of bonded and/or grouped devices. In some examples, the method 1400 can also be implemented by any of the playback devices (e.g., devices 200, 210, or 220) disclosed herein, individually or in combination with any of the computing systems disclosed herein, or any other suitable computing system(s) and/or suitable user device(s).

At block 1410, one or more bonded or grouped devices are detected. In some examples, for instance, the method comprises detecting an instruction (e.g., via a control device or a voice command) for two or more devices to form a bonded zone and/or a group of playback devices. In some examples, the method 1400 is performed on an existing bonded zone or group of devices without detecting the instruction for the devices to form the bonded zone or group of devices. In certain examples, the method 1400 is performed in response to a detection of a trigger condition. Trigger conditions can include, for instance, a detection of change of position and/or orientation of one or more devices in a bonded zone or group, a re-connection of one or more devices that were offline or temporarily unavailable (e.g., because of loss of network connectivity or electrical power), and/or manual input.

At block 1420, a calibration can be performed to estimate or determine the combined output of the bonded zone and/or group of devices. In some examples, the calibration comprises determining a distance between at least two devices in the bonded zone or group of devices. For instance, as described above with respect to FIG. 13, in some examples, a separation distance determination can be used as part of an audio parameter adjustment. In some examples, the determined separation distance can be used with information corresponding to characteristics of the listening environment (e.g., room volume, room surface area, room materials, room absorption coefficients and/or reverberation times) to perform a calibration.

In some examples, the calibration may comprise a determination of the spectral and/or spatial frequency characteristics of a listening environment. For instance, in certain examples, the calibration at block 1420 comprises emitting and/or receiving calibration audio via one or more devices in the bonded zone and/or group. The calibration may comprise a first measurement comprising a single device of the one or more devices and a second measurement comprising two or more devices of the one or more devices. In this way, a difference between frequency responses of the outputs of a) a single device and b) two or more devices can be obtained.

At block 1430, audio output of at least one device of the one or more devices can be adjusted based on the calibration. In some examples, the audio output adjustment comprises applying a filter, such as a low frequency shelf filter or another suitable filter, based on a determined distance between two or more of the devices. In some examples, the audio output adjustment comprises modulating, filtering, or otherwise adjusting the output such that the combined output of two or more devices is about the mono level of a single device increased by a predetermined amount (e.g., between about 1 dB and about 10 dB, between about 2 dB and about 5 db, and/or about 3 dB). In some examples, the adjusting the audio output of at least one device comprises reverting a filter, such as a low frequency filter, to a single player or mono low frequency player in response to a detected loss of connectivity by one or more of the other playback devices. For instance, if a second playback device of a stereo pair goes offline (e.g., via a loss of network connectivity, loss of power), a first playback device can revert its audio output adjustment according to a single player mode with a corresponding low frequency filter.

FIG. 15 is a graph 1500 of frequency response plots for two playback devices separated by varying distances (e.g., less than 2 ft, 2 ft, 4 ft, 6 ft, 8 ft) and a reference mono plot 1510 indicative of the output of a single device. In some examples, a media playback system (e.g., the media playback system 100 described above with respect to FIG. 1B) can set an adjusted low frequency level of the output below a predetermined frequency (e.g., 50 Hz, 100 Hz, 150 Hz, 200 Hz, 250 Hz, 500 Hz, 1 kHz) to be approximately equal to the mono bass response below the predetermined frequency plus an additional amount. Under this approach, the wide variability of the low frequency portion(s) of the frequency responses of the same devices based on separation distance can be partially or substantially mitigated, resulting in a more natural, balanced listening experience.

VII. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, as explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VIII. Examples

The present technology is illustrated, for example, according to various aspects described below. Various examples of aspects of the present technology are described as numbered examples for convenience. These are provided as examples and do not limit the present technology. It is noted that any of the dependent examples may be combined in any combination and placed into a respective independent example. The other examples can be presented in a similar manner.

(Example 1) A method comprising: receiving an instruction to operate in a first playback configuration in which a first channel of multichannel audio content plays back via a first playback device in synchrony with playback of a second channel of the multichannel audio content via a second playback device; determining, after receiving the instruction to operate in the first playback configuration, a distance between the first playback device and the second playback device; determining, based on the determined distance, a first audio parameter; causing the first playback device to play back the first channel of the multichannel audio content according to the determined first audio parameter; and causing the second playback device to play back the second channel of the multichannel audio content according to the determined first audio parameter.

(Example 2) The method of Example 1, further comprising: detecting a change in location or orientation of at least one of the first playback device and the second playback; determining, after detecting the change in location or orientation, a second distance between the first playback device and the second playback device; determining, based on the second distance, an updated first audio parameter; and causing, via the network interface, to operate in a second playback configuration in which the second playback device plays back the second channel of multi-channel audio content according to the updated first audio parameter.

(Example 3) The method of either Example 1 or Example 2, wherein determining the distance between the first and second playback devices comprises transmitting, via the first playback device to the second playback device, an ultra-wideband (UWB) signal.

(Example 4) The method of any of Examples 1-3, wherein determining the distance between the first and second playback devices comprises receiving, via one or more microphones of the first playback device, audio output via the second playback device.

(Example 5) The method of Example 4, wherein determining the distance between the first and second playback devices comprises causing, via a network interface of the second playback device, one or more calibration tones to be output via the second playback device.

(Example 6) The method of any of Examples 1-5, wherein determining the first audio parameter comprises matching the determined distance to one or more corresponding filter characteristics in a lookup table.

(Example 7) The method of any of Examples 1-6, wherein determining the distance between the first and second playback devices comprises using a speed-of-light measurement modality and a slower than a speed-of-light measurement modality.

(Example 8) The method of any of Examples 1-7, wherein determining the first audio parameter comprises determining, for a particular listening environment in which the first and second playback devices are located, a mono output of the first playback device comprising a frequency range less than a predetermined frequency.

(Example 9) The method of Example 8, wherein determining the mono output comprises an estimating an expected mono output based on one or more characteristics of the particular listening environment.

(Example 10) The method of Example 8, wherein determining the mono output comprises outputting calibration audio via the first playback device.

(Example 11) The method of any of Examples 8-10, wherein determining the updated first audio parameter comprises determining a filter that maintains audio output substantially within a predetermined amount greater than the mono output in the frequency range.

(Example 12) The method of any of Examples 1-11, further comprising: detecting a loss of connectivity of the second playback device; and reverting, in response to the detected loss of connectivity, the first audio parameter to correspond with a single player configuration.

(Example 13) One or more tangible, non-transitory computer-readable media comprising instructions that, when executed by one or more processors of at least one playback device, cause the at least one playback device to perform the method of any preceding Example.

(Example 14) A playback device comprising: a network interface; one or more transducers; and one or more processors configured to cause the playback device to perform the method of one of Examples 1 to 12.

(Example 15) The playback device of claim 14, further comprising: one or more microphones; and one or more antenna configured to transmit and/or receive ultra-wideband energy.

(Example 16) A first playback device comprising: a network interface; at least one processor; at least one non-transitory computer-readable medium comprising program instructions that are executable by the at least one processor such that the first playback device is configured to: determine a distance to a second playback device with respect to the first playback device; determine, based on the determined distance, an adjusted audio parameter; and after a determination of the distance to the second playback device with respect to the first playback device, cause, via the network interface, the second playback device to operate in a first playback configuration in which the second playback device plays back a second channel of multi-channel audio content according to the adjusted audio parameter in synchrony with playback of a first channel of the multi-channel audio content via the first playback device.

(Example 17) The first playback device of Example 16, wherein the distance is a first distance, and wherein the at least one non-transitory computer-readable medium further comprises program instructions that are executable by the at least one processor such that the first playback device is configured to: detect that at least one of the first playback device and the second playback has moved; after detecting that at least one of the first playback device and the second playback has moved, determine a second distance to the second playback device with respect to the first playback device; determine, based on the second distance, an updated audio parameter; and cause, via the network interface, to operate in a second playback configuration in which the second playback device plays back the second channel of multi-channel audio content according to the updated audio parameter.

(Example 18) The first playback device of either Example 16 or Example 17, wherein determining the distance to the second playback device with respect to the first playback device comprises transmitting or receiving an ultra-wideband (UWB).

(Example 19) The first playback device of any of Examples 16-18, further comprising: one or more microphones, wherein determining the distance to the second playback device with respect to the first playback device comprises receiving, via the one or more microphones, at least a portion of a predetermined sound waveform from the second playback device.

(Example 20) The first playback device of Example 19, wherein determining the distance to the second playback device with respect to the first playback device comprises comparing.

What is claimed is:

1. A media playback system comprising a first playback device and a second playback device, wherein:
the first playback device comprises a first non-transitory computer readable medium storing instructions executable by one or more first processors to cause the first playback device to:
receive a positioning signal transmitted from the second playback device,
determine, based at least in part on the received positioning signal, a relative position of the first playback device with respect to the second playback device,
use the relative position to determine a first playback configuration for the first playback device and a second playback configuration for the second playback device,
send instructions to the second playback device, wherein the instructions identify the second playback configuration, and
play back a first channel of multichannel audio content in accordance with the first playback configuration; and
the second playback device comprises a second non-transitory computer readable medium storing instructions executable by one or more second processors to cause the second playback device to:
transmit the positioning signal to the first playback device,
receive the instructions from the first playback device, and
play back a second channel of the multichannel audio content in accordance with the second playback configuration.

2. The media playback system of claim 1, wherein the instructions executable by the one or more first processors further cause the first playback device to receive an instruction to play back the first channel of the multichannel audio content in synchrony with playback of the second channel of the multichannel audio content at the second playback device.

3. The media playback system of claim 1, wherein determining the relative position of the first playback device with respect to the second playback device comprises determining a distance between the first playback device and the second playback device.

4. The media playback system of claim 1, wherein the instructions executable by the one or more first processors further cause the first playback device to:
detect loss of a data connection with the second playback device; and
revert, in response to the detected loss of the data connection, the first playback configuration to correspond with a single player configuration.

5. The media playback system of claim 1, wherein:
the instructions executable by the one or more first processors further cause the first playback device to:
detect loss of a data connection with the second playback device, and
revert, in response to the detected loss of the data connection with the second playback device, the first playback configuration to correspond with a single player configuration; and
the instructions executable by the one or more second processors further cause the second playback device to:
detect loss of a data connection with the first playback device, and
revert, in response to the detected loss of the data connection with the first playback device, the second playback configuration to correspond with the single player configuration.

6. The media playback system of claim 1, wherein determining the relative position comprises using a speed-of-light measurement modality and a slower than the speed-of-light measurement modality.

7. The media playback system of claim 1, wherein:
determining the first playback configuration comprises estimating an expected mono output based on one or more characteristics of a listening environment in which the first playback device and the second playback device are located; and
the expected mono output comprises a frequency range less than a predetermined frequency.

8. The media playback system of claim 1, wherein determining the first playback configuration comprises determining a filter that maintains audio output substantially within a predetermined amount greater than an expected mono output in a frequency range less than a predetermined frequency.

9. The media playback system of claim 1, wherein the positioning signal is an ultra-wideband signal.

10. The media playback system of claim 1, wherein:
the first playback device further comprises a microphone;
the second playback device further comprises a speaker; and
receiving the positioning signal transmitted from the second playback device comprises receiving, via the microphone of the first playback device, audio output produced by the speaker of the second playback device.

11. The media playback system of claim 1, wherein:
determining the relative position of the first playback device with respect to the second playback device comprises determining a distance between the first playback device and the second playback device; and
determining the first playback configuration for the first playback device comprises matching the distance to one or more corresponding filter characteristics in a lookup table.

12. The media playback system of claim 1, wherein:
the first playback device further comprises a plurality of antennas; and
the positioning signal is received by at least two of the plurality of antennas.

13. A method comprising:
transmitting a positioning signal from a second playback device to a first playback device;
determining, based at least in part on receipt of the positioning signal at the first playback device, a relative position of the first playback device with respect to the second playback device;
using the relative position to determine a first playback configuration for the first playback device and a second playback configuration for the second playback device;
sending instructions from the first playback device to the second playback device, wherein the instructions identify the second playback configuration;
causing the first playback device to play back a first channel of multichannel audio content in accordance with the first playback configuration; and
causing the second playback device to play back a second channel of the multichannel audio content in accordance with the second playback configuration.

14. The method of claim 13, further comprising:
  detecting that the relative position has changed to an updated relative position of the first playback device with respect to the second playback device;
  using the updated relative position to determine an updated first playback configuration for the first playback device; and
  causing the first playback device to play back the first channel of the multichannel audio content in accordance with the updated first playback configuration.

15. The method of claim 13, wherein determining the relative position comprises causing one or more calibration tones to be output by the second playback device.

16. The method of claim 13, further comprising:
  detecting loss of a data connection between the first playback device and the second playback device; and
  reverting, in response to the detected loss of the data connection, the first playback configuration to correspond with a single player configuration.

17. The method of claim 13, wherein determining the relative position comprises using a speed-of-light measurement modality and a slower than the speed-of-light measurement modality.

18. The method of claim 13, wherein:
  determining the first playback configuration comprises estimating an expected mono output based on one or more characteristics of a listening environment in which the first playback device and the second playback device are located; and
  the expected mono output comprises a frequency range less than a predetermined frequency.

19. The method of claim 13, wherein:
  the second playback device is a portable device that comprises a battery; and
  the method further comprises detecting that the relative position has changed to an updated relative position between the first playback device and the second playback device.

20. The method of claim 13, further comprising receiving, by the first playback device, an instruction to play back the first channel of the multichannel audio content in synchrony with playback of the second channel of the multichannel audio content at the second playback device.

* * * * *